US006430430B1

(12) United States Patent
Gosche

(10) Patent No.: US 6,430,430 B1
(45) Date of Patent: Aug. 6, 2002

(54) METHOD AND SYSTEM FOR KNOWLEDGE GUIDED HYPERINTENSITY DETECTION AND VOLUMETRIC MEASUREMENT

(75) Inventor: Karen M. Gosche, Wesley Chapel, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 09/561,956

(22) Filed: May 1, 2000

Related U.S. Application Data

(60) Provisional application No. 60/131,590, filed on Apr. 29, 1999.

(51) Int. Cl.[7] ................................................ A61B 5/05
(52) U.S. Cl. ...................... 600/410; 128/920; 128/923; 128/925; 382/293; 382/294
(58) Field of Search ............................. 600/410, 407; 128/920, 923, 925; 382/294, 293

(56) References Cited

U.S. PATENT DOCUMENTS

| | | | | |
|---|---|---|---|---|
| 4,991,092 A | * | 2/1991 | Greensite | |
| 5,262,945 A | * | 11/1993 | DeCarli et al. | |
| 5,695,501 A | * | 12/1997 | Carol et al. | |
| 6,253,210 B1 | * | 6/2001 | Smith et al. | |

OTHER PUBLICATIONS

Karen M. Gosche, et al., "Automated Quantification of Brain Magnetic Resonance Image Hyperintensities Using Hybrid Clustering and Knowledge–Based Methods", John Wiley & Sons, Inc., Int. J. Imaging Syst. Technol. vol. 10, 1999, vol. 10, pp. 287–293.

D. Goldberg–Zimring, et al., "Automated Detection and Characterization of Multiple Sclerosis Lesions in Brain MR Images", Magnetic Resonance Imaging, vol. 16, No. 3, 1998, pp. 331–318.

B. Johnston, et al., "Segmentation of Multiple Sclerosis in Intensity Corrected Multispectral MRI", IEEE Transactions on Medical Imaging, vol. 15, No. 2, Apr. 1996, pp. 154–169.

Simon Warfield, et al., "Automatic Identification of Gray Matter Structures from MRI to Improve the Segmentation of What Matter Lesions", Journal of Image Guided Surgery, vol. 1, 1995, pp. 326–338.

(List continued on next page.)

Primary Examiner—Marvin M. Lateef
Assistant Examiner—Ialaya G James
(74) Attorney, Agent, or Firm—Katten Muchin Zavis Rosenman

(57) ABSTRACT

An automated method and/or system for identifying suspected lesions in a brain is provided. A processor (a) provides a magnetic resonance image (MRI) of a patient's head, including a plurality of slices of the patient's head, which MRI comprises a multispectral data set that can be displayed as an image of varying pixel intensities. The processor (b) identifies a brain area within each slice to provide a plurality of masked images of intracranial tissue. The processor (c) applies a segmentation technique to at least one of the masked images to classify the varying pixel intensities into separate groupings, which potentially correspond to different tissue types. The processor (d) refines the initial segmentation into the separate groupings of at least the first masked image obtained from step (c) using one or more knowledge rules that combine pixel intensities with spatial relationships of anatomical structures to locate one or more anatomical regions of the brain. The processor (e) identifies, if present, the one or more anatomical regions of the brain located in step (d) in other masked images obtained from step (c). The processor (f) further refines the resulting knowledge rule-refined images from steps (d) and (e) to locate suspected lesions in the brain.

40 Claims, 8 Drawing Sheets

Intensity distribution for 4th class pixels (PDw). Dashed line is best fit Gaussian.

OTHER PUBLICATIONS

Chunlin Li, et al., "Knowledge–Based Classification and Tissue Labeling of MR Images of Human Brain", IEEE Transaction on Medical Imaging, vol. 12, No. 4, Dec. 1993, pp. 740–750.

Ioannis Kapouleas "Automatic detection of white matter lesions in magnetic resonance brain images", Computer Methods and Programs on Biomedicine, vol. 32, 1990, pp. 17–35.n.

J. Ross Mitchell, Ph.D., et al., "MR Multispectral Analysis of Multiple Sclerosis Lesions", JMRI, vol. 7, No. 3, 1997, pp. 499–511.

J. Ross Mitchell, et al., "The variability of manual and computer assisted quantification of multiple sclerosis lesion volumes", Med. Phys. vol. 23, No. 1, Jan. 1996, pp. 85–97.

J. Ross Mitchell, et al., "Computer–assisted Identification and Quantification of Multiple Sclerosis Lesions in MR Imaging Volumes in the Brain", JMRI, vol. 4, No. 2, Mar./Apr. 1994, pp. 197–208.

Marika J. Hohol, MD., et al., "Serial Neuropsychological Assessment and Magnetic Resonance Imaging Analysis in Multiple Sclerosis", Arch Neurol., vol. 54, 1997, pp. 1018–1025.

J. K. Udupa, et al., "Multipe Sclerosis Lesion Quantification Using Fuzzy–Connectedness Principles", IEEE Transactions on Medical Imaging, vol. 16, No. 5, Oct. 1997, pp. 598–609.

David A. G. Wicks, et al., "CORRECTION OF INTENSITY NONUNIFORMITY IN MR IMAGES OF ANY ORIENTATION ", Magnetic Resonance Imaging, vol. 11, No. 2, 1993, pp. 183–196.

Bruno Alfano, et al., "Multiparametric Display of Spin–Echo Data from MR Studies of Brain", JMRI vol. 5, No. 2, Mar./Apr. 1995, pp. 217–225.

Bruno Alfano, et al., "Simultaneous Display of Multiple MR Parameters with "Quantitative Magnetic Color Imaging"", Journal of Computer Assisted Tomography, vol. 16, No. 4, 1992, pp. 634–640.

Arturo Brunetti, et al., "White matter lesion detection in multiple sclerosis: improved interobserver concordance with multispectral MRI display", J. Neurol. vol. 244, (1997), pp. 586–590.

Charles DeCarli, et al., "Method for Quantification of Brain, Ventricular, and Subarachnoid CSF Volumes from MR Images", Journal of Computer Assisted Tomography, vol. 16, No. 2, (1992), pp. 274–284.

Charles DeCarli, et al., "The effect of white matter hyperintensity volume on brain structure, cognitive performance, and cerebral metabolism of glucose in 51 healthy adults", Neurology, vol. 45, Nov. 1995, pp. 2077–2084.

F. Pannizzo, et al., "Quantitive MRI Studies for Assessment of Multiple Sclerosis", Magnetic Resonance in Medicine, vol. 24, 1992, pp. 90–99.

Simon Vinitski, et al., "Improved Intracranial Lesion Characterization by Tissue Segmentation Based on a 3D Map", MRM, vol. 37, 1997, pp. 457–469.

Liqun Wang, et al., "Correction for Variations in MRi Scanner Sensitivity in Brain Studies with Histogram Matching", MRM, vol. 39, 1998, pp. 322–327.

Supun Samarasekera, et al., "A New Computer–Assisted Method for the Quantification of Enhancing Lesions in Multiple Sclerosis", Journal of Computer Assisted Tomography, vol. 21, No. 1, 1997, pp. 145–151.

Keith A. Johnson, MD, et al., "Comparison of Magnetic Resonance and Roentgen Ray Computed Tomography in Dementia", Arch Neurol, vol. 44, Oct. 1987, pp. 1075–1080.

D.A.G. Wicks, et al., "Volume measurement of multiple sclerosis lesions with magnetic resonance images" Neuroradiology, vol. 34, 1992, pp. 475–479.

Alex P. Zijenbos, et al., "Morphometric Analysis of White Matter Lesions in MR Images: Method and Validation", IEEE Transaction on Medical Imaging, vol. 13, No. 4, Dec. 1994, pp. 716–724.

* cited by examiner

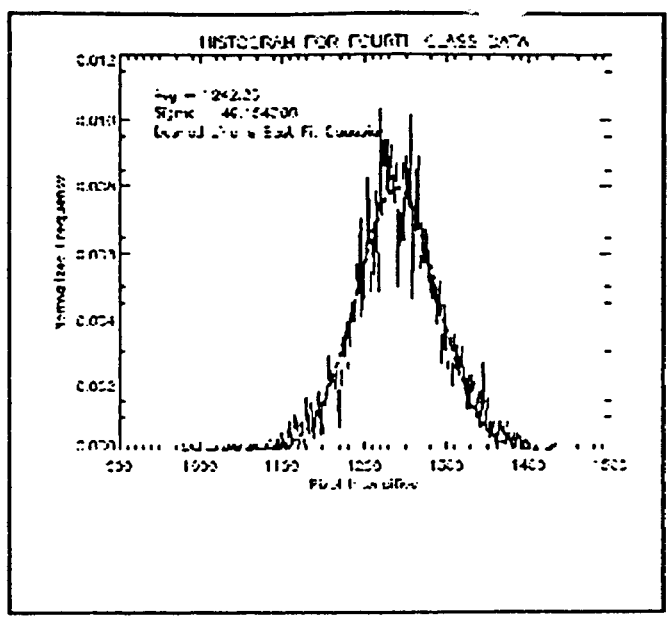
Figure 1. Intensity distribution for 4th class pixels (PDw). Dashed line is best fit Gaussian.

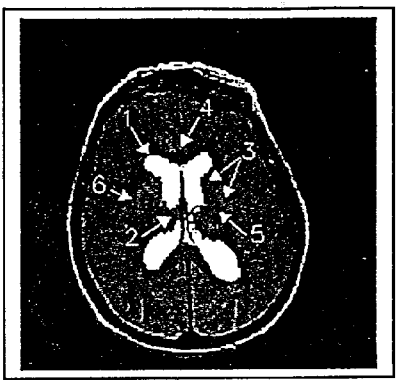

Figure 2. Lateral ventricle (yellow). Relevant structure labels: 1) laterval ventricles (yellow); 2) thalamus; 3) basal ganglia (occurs bilaterally and includes the lenticular nuclei and head of the caudate nuclei); 4) genu of the *corpus callosum*; 5) internal capsule (occurs bilaterally); 6) external capsule (occurs bilaterally).

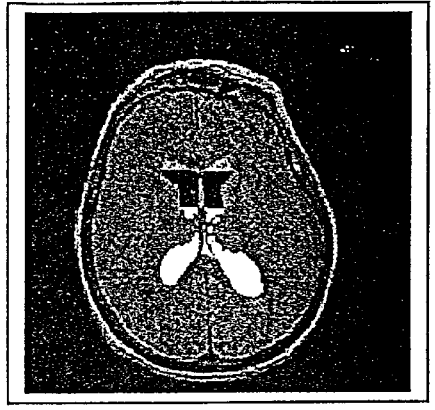

Figure 3. Lateral ventricle divided as superior (green), central (red), and interior (yellow) to the caudate curvatures.

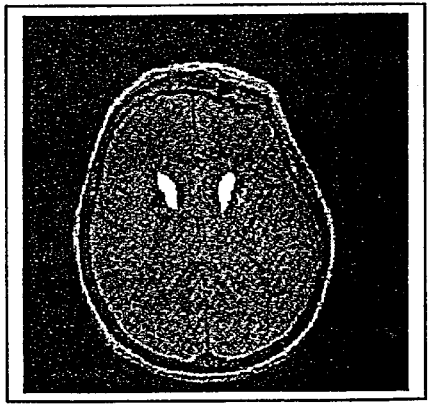

Figure 4. Caudate nuclei (yellow), lenticular nuclei (green/red), hyperintensity within lenticular nuclei (red).

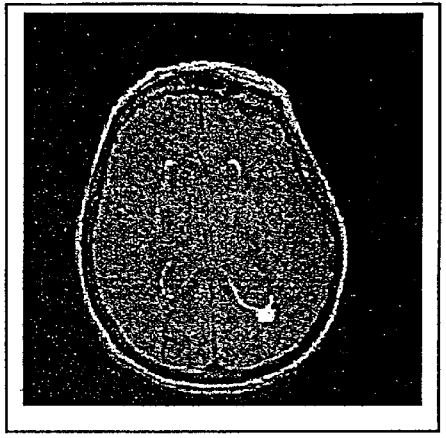
Figure 5. Periventricular ring (orange).
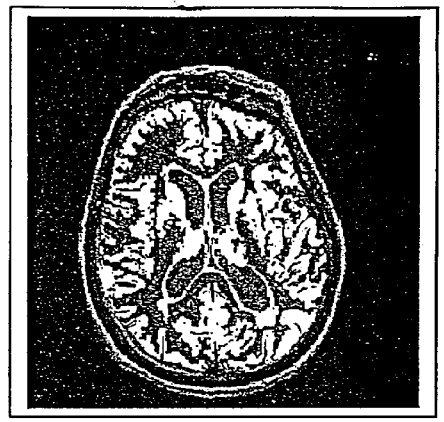
Figure 7. VGC segmentation of 3rd and 4th class tissue (yellow).
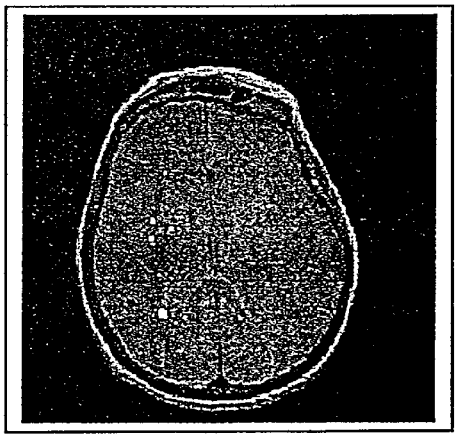
Figure 6. Hyperintense lesions embedded within the WM (yellow).
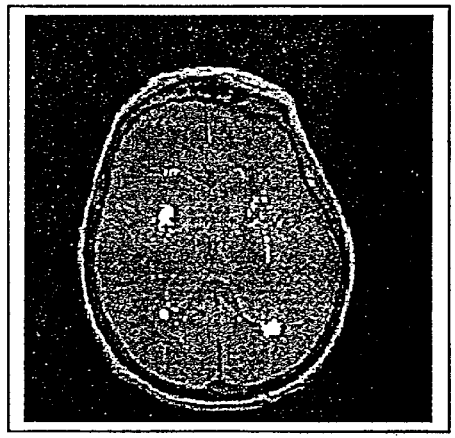
Figure 8. KGHID lesion detection output (yellow).

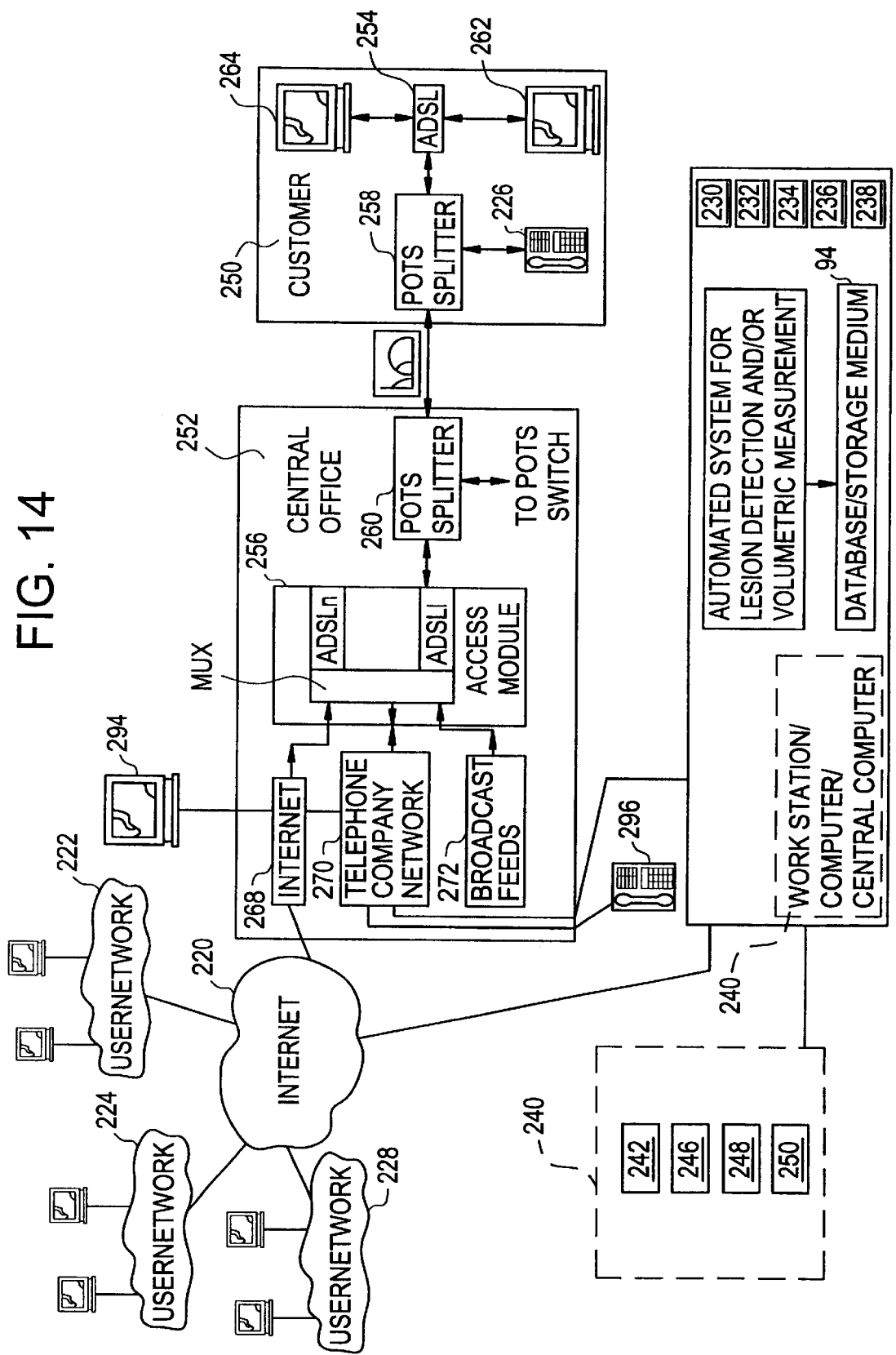

METHOD AND SYSTEM FOR KNOWLEDGE GUIDED HYPERINTENSITY DETECTION AND VOLUMETRIC MEASUREMENT

1. RELATED APPLICATIONS

This application claims priority from U.S. provisional patent application entitled KNOWLEDGE GUIDED HYPERINTENSITY DETECTION, Ser. No. 60/131,590, to Gosche, filed Apr. 29, 1999, and U.S. provisional patent application entitled METHOD AND SYSTEM FOR KNOWLEDGE GUIDED HYPERINTENSITY DETECTION, filed Apr. 21, 2000, to Gosche, the details of which are hereby incorporated by reference.

2. FIELD OF THE INVENTION

This invention relates generally to the field of magnetic resonance imaging ("MRI") and, in particular, to the automation of the interpretation of information present in MRI images to detect brain lesions. More specifically, the present invention relates to a method and/or system of detecting hyperintense regions in MRI images that are suspected of being related to various brain pathologies, such as Alzheimer's Disease, Multiple Sclerosis and like neurodegenerative conditions and/or determining volumetric measurements of cerebral anatomical regions.

3. BACKGROUND OF THE INVENTION

Present day computerized methods of hyperintensity identification in brain magnetic resonance images either rely heavily on human intervention, or on simple thresholding techniques. Consequently, these methods lead to considerable variation in the quantification of brain hyperintensities depending on image parameters such as contrast.

A review of a number of the published computerized segmentation techniques reveals the following. The manual or semi-automatic techniques, requiring informed judgment on the part of an experienced diagnostician, will be discussed first followed by a discussion of techniques considered fully automatic that generally require little or no operator interaction.

3.1. Manual or Semi-Automatic Techniques

Cline et al.[6] present a technique to produce a 3D segmentation of the head employing T1 and T2 images. This method requires an initial visual classification of a relatively small sample of the tissue types in the T1 and T2 images by an experienced radiologist to begin. The accuracy of this initial input directly affects the accuracy of the succeeding classification algorithm, which classifies the remaining tissue based on a bivariate distribution model for each tissue type. The possible classification outputs are; background, brain, CSF, WM, lesion, tumor, arteries or veins. Once the initial classification is made, a feature map is constructed employing clustering based on the bivariate normal probability distribution. With this feature map, segmentation is performed by replacing the voxel with the above tissue label assigned by the probabilistic calculation. Upon the completion of the segmentation, the resulting surfaces are filtered twice using a 3D diffusion filter to smooth discontinuities created by misclassifications and to improve rendering. A 3D connectivity algorithm then extracts surfaces from this smoothed, segmented data set. Finally, a dividing cubes algorithm is used to process the voxels marked in the connectivity algorithm for display. This method is rated with only preliminary results for three selected patients; one normal, one MS case and one tumor. It is important to reiterate that success of the classification depends upon the operator's level of expertise. This method may be most useful as a surgical planning tool, or perhaps as a visualization tool, which appears to be the original intent.

Hohol et al.[7] have adopted a similar technique. This method begins by manually isolating the intracranial cavity using the PD and T2 images. Regions of interest (ROI) are then generated for brain parenchyma and CSF to aid the Expectation Maximization (EM) tissue classifier. Each image for a patient is registered to a time reference image, and the EM classifier is used to classify each pixel of each image as either WM, GM, CSF, or lesion tissue. This classification includes an unspecified correction for partial voluming artifacts. Individual lesions are fixed by the use of a 4 dimensional connectivity algorithm that is assumed to similar to Cline[6] with the addition of a time dimension. With use of the time dimension element, lesion volumes are reported to change over time. No verification of the imaging technique is reported. However, the authors do report lesion burden correlation with the neuropsychological test scores of MS patients.

Wicks et al.[8] employ two manually selected thresholds to perform white matter lesion (WML) detection. The first is set to separate brain tissue from the skull, while the second is set to identify all areas definable as lesions having intensities greater than the brain tissue. In order to preserve accurate boundaries, the threshold is set somewhat lower in value than that is required to identify the lesions. The outlines of the identified lesions are superimposed on the original T2 image to allow manual correction of misclassification. It is reported that this requirement poses no additional burden since it prevents the operator from having to outline each lesion manually. It is also stated that the established threshold can be used for any successive serial study of one patient provided that the intensity histograms from later studies are scaled to match that of the initial study. Overall, this semi-automated thresholding technique generates approximately half the inter-observer variation than purely manual outlining technique, but it is stated that visual assessment of the delineation of the lesions between the manual technique and this semi-automatic one are "equally plausible". The semi-automatic double threshold method is probably suitable for use with small patient sets in a non-critical research environment.

Wang et al.[9] report a similar global thresholding technique that employs intensity correction of interslice scans. In practice a reference histogram is generated from some arbitrary scan slice. From the next scan slice, another histogram is generated. The (low) background intensities are cut from the histograms using al sharp cut-off windowing function with a Hanning slope. A manually chosen parameter defines the number of bins required for this cut-off line to reach its maximum value of 1.0. The second histogram is matched to the first by minimizing the squared differences between them. This process permits a more satisfactory selection of global thresholds for a patient, as all subsequent scan slices are matched in sequence. Although the technique undoubtedly subdues the intensity variations for WM lesions across scans, the accuracy of the resulting lesion volumes cannot be judged as no independent measures are reported.

Zijenbos et al.[10] describe a semi-automatic method based on pattern recognition and built around a back-propagation artificial neural network (ANN). This is done to minimize the required input training points needed to achieve a successful tissue classification. The method begins with the use of an inter-cranial contour algorithm to remove the skull and incidental CSF, followed by an intensity correction algorithm to remove the shading, or intensity inhomogeneity artifact. This correction requires the operator to select 10 to 20 points in the WM that therefore strongly influences the detected lesion load. The intensity correction is followed by the same diffusion filter mentioned in Cline[6] to enhance the signal/noise ratio. Finally, the tissue classification occurs using the ANN with 3 input nodes (T1,T2, PD) and five output nodes; background, WM, GM, CSF, and WML. One 'sample of each class input tissue class is presented in sequence to the ANN until convergence (segmentation) occurs. Upon the completion of classification by the ANN, postprocessing is required to remove the WML that occur in close proximity to GM along the sulci and correct the classification errors caused by misregistration of the T1 image. In addition, all WML smaller than 10 pixels are eliminated as they are assumed to be the result of noise or misregistration in the T1 image. This semi-automated technique is compared with a completely manual method using two different observers. Their published results relating inter-rater and intra-rater variation using the kappa statistic indicate that the two techniques are well correlated, neither showing an obvious advantage over the other with respect to the observers used in the study. Although the technique is technically sophisticated, it is limited by its requirement of expert knowledge on the part of the operator. An experienced diagnostician may find it useful as a visualization tool aiding for documenting disease progression.

Mitchell et al.[11] have published a semi-automated technique that is similar in some respects to Zijbendos[10]. This method uses the k-nearest neighbor (kNN) classifier that is applied to operator selected image regions. The process begins with operator selection of pure CSF regions and known WM from multiple locations within the image to overcome intensity variations due to radio frequency (RF) inhomogeneity. Thus trained, the classifier is able to separate CSF and WM. In a similar manner, the kNN classifier is used to detect pixels representing lesion pathology. Consequently, the image is classified into WM, CSF, and WML without reference to GM. All pixels labeled as lesions are then highlighted on the MRI image for operator verification. This process is reported as requiring several iterations involving operator refinement of the classifications. It is reported that inter-rater reliability for this semi-automatic method is roughly half of that reported by the purely manual method, while showing a 25% improvement over the manual method with respect to intra-rater reliability. Therefore, very little diagnostic leverage is obtained since expert knowledge is required to pass judgment on lesion identification. It however does appear to be an excellent tool for documenting disease progression if used by an experienced neuroradiologist.

Mitchell et al.[12] report another method which is a manual outlining technique that employs a novel use of the multispectral data to enhance clinical diagnosis. This method begins with routine outlining of the MS lesions by a radiologist. A tissue intensity analysis is subsequently performed with the assumption that the CSF characteristics will not change over time and thus can be used to calibrate, or normalize, the image intensities of the PD and T2 slices. The same technique is applied to "normal appearing" WM regions to develop a cluster mean to better differentiate it from "abnormal" WM. An equivalent WM-GM (eW-G) spectrum is formed by projecting this 2D multispectral feature data onto a 1D axis using a principle component analysis. The unique feature of this technique is that the measured changes in the eW-G spectrum correlation well with disease progression especially when lesion size changes are not apparent. It is stated that the use of the eW-G spectra could relax the requirement for accurately defining lesion boundaries in the measure of disease progression. This technique would be applicable as a research or diagnostic tool to identify disease progression based on the "eW-G" spectra, while specifically useful in diagnosis of MS with its relatively large diffuse lesions.

Samarasekera et al.[13] report a semi-automatic method that utilizes the fuzzy connectedness principles to achieve lesion segmentation. This method begins by selecting 10 centrally located slices from within the imaged head and constructing an intensity histogram. From this, an empirical intensity threshold is set by finding the first pixel value which is greater in intensity than the second highest peak in the histogram, but has a bin count that is 93% less than that second highest peak. This threshold is used to create a binary volume containing only the brightest appearing pixels. The original 3D volume image is next thresholded at a low value to create another binary image corresponding to skull tissue. These two binary volume images are subsequently analyzed with a connected component algorithm and any components connected in both binary images are considered blood vessels and eliminated. Any remaining voxels in the first binary volume are thought to represent true and false positive lesions. A fuzzy connectedness algorithm is applied to the original volume image, using the previously derived binary volume image, as a template to determine membership grades based on neighborhood connectedness and intensity similarity. Fuzzy objects formed on the basis of the fuzzy threshold (40%) are tested for connection to the scalp binary volume image, and if connected are eliminated. Any fuzzy object with a membership of greater than 1500, or less than 7 voxels is also eliminated. Finally, any remaining objects are now superimposed on slice images for operator approval as lesions. Test results, using four neuroradiologists, show that this method has a detection sensitivity of 97% compared to the radiologists, and a false negative volume fraction of 1.3%, with false positives virtually non-existant. This technique, although requiring expert knowledge, demonstrates value as a diagnostic tool if the claimed false positive rate can be maintained.

Mitchell et al.[14] describe a semi-automatic technique to segment MS lesions in 3D data sets using only the T2 and PD weighted images. The technique generates 2D histograms of operator defined ROI to allow feature space classification of these regions using either an interactive kNN classification algorithm or a maximum likihood (ML) classifier. When used with the kNN classifier, two operator selected thresholds determine the classification parameters for each cluster based on proximity of the threshold to the data to be clustered. When used with the ML classifier, mean and covariance values from the tissue ROI are used to establish those same parameters for the data clusters. A principle component analysis is used to establish an elliptical region about the mean for classification of each cluster. Knowledge supplied by the operator is used to establish confidence intervals and vary the classification thresholds accordingly. With completion of classification using either method, the resulting tissue classes are assigned colors and applied to the 3D image. This method is not able to directly segment lesion without operator direction, but once manually detected, is able to quantify their volumes. The accuracy of the method's ability to calculate volumes is measured against phantom studies with the assumption that larger measured volumes have less error. The technique requires an extensive amount of specialized knowledge from the operator, and is likely not to be useful except to test the concept of the classifying tools.

Vinitski et al.[15] describe a similar method also based on a kNN classifier. The RF inhomogeneity is corrected in the T1,T2 and PD images by applying a correction matrix developed from imaging an oil filled cylinder. The 3D anisotropic diffusion filter is then applied to remove partial volume effects on image voxels, while leaving edges and small lesions relatively distinct. An expert observer is required to identify multiple samples of 8 different tissue types (as per Cline[6]) to initiate the kNN classifier, which employed a "k" of 20 for 2D classification, and a "k" of 40 for 3D classification. The resulting tissue classifications are then judged by 5 board certified neuroradiologists for accuracy. Statistical analysis of these rankings are used to assign a most probable tissue classification to each voxel. The resulting 2D or 3D images are then color coded by the expected tissue type. Finally, a connectivity algorithm is used to extract surfaces, and a dividing cubes algorithm is used to construct desired surfaces of interest. The accuracy of the technique is evaluated using volumetric phantoms with accuracies of 45 to 8% reported. It appears that the technique as described is able to differentiate MS pathology from gliosis and edema. In view of the extensive requirement of neurology expertise, this technique is of limited value in actual clinical applications.

Pannizzo et al.[16] report a semi-automated method of MS lesion quantification that is histogram driven. The method using an edge following algorithm to remove skull tissue that is subsequently judged by an operator. And, if needed, selects a new threshold in case of rejection. Upon successful removal of the skull, a histogram of the remaining brain tissue is generated and presumed bimodal. The brain tissue is segmented into two distributions; a central distribution corresponding to WM/GM tissue, and higher intensity pixels that correspond to MS lesions and periventricular effusions (PVE). Thresholds are calculated from the histogram where fitted lines to the sides of the central distribution cross the horizontal axis. The operator is again asked to judge the performance of this step and make the appropriate corrections if needed. It is assumed that all of the higher intensity pixels, once segmented in the previous step, are identified as lesions, plaques, or edema. The relative accuracy of the WM/GM semi-automated segmentation is stated as being within 97% agreement for two different operators. No estimate of MS lesion accuracy is claimed. This technique, requiring a large amount of operator interaction, is unlikely to be judged useful in a clinical context.

3.2. Fully Automated Techniques

Discases such as MS and AD pose a burden upon neuroradiologists since they are often required to establish a diagnostic judgment using rough estimates from many image slices. As a result, fully automatic techniques may reduce the workload of neuroradiologists and perhaps aid in treatment efficiency. To complete this review, a representative sample of fully automated lesion detection techniques is presented below.

Kapouleas[17] describes an automated system that requires the use of a model or atlas to remove false positive lesions. The brain tissue is segmented from the skull using the PD images, while lesions are detected using a simple threshold in the T2 slices. An initial removal of false positives lesions is completed by measuring the average intensity of the each brain slice based on the outline derived during the PD segmentation. The threshold is adjusted such that all pixels not brighter than 30% of the average in both the PD and T2 slice are rejected. A 3D representation is constructed from the stacked PD segmentations and a "locally deformable" 3D geometric atlas is made to fit the imaged brain. Using the locations defined by this atlas, the remaining false positives are removed. This method is judged for validity by comparing lesion output counts/locations with that of radiologists. The technique achieves a reported 87% agreement with the radiologists for axial images while falling to 78% agreement for coronal images. The lack of detail in the description of the method and the relatively low reported detection sensitivities lead to the conclusion that this tool may not be as useful as the manual technique presented by Samaraskera[13].

Li et al.[18] report a knowledge-based method built around the fuzzy c-means algorithm (FCM). The algorithm relies exclusively on intensity class relationships derived from the T2 slice and is restricted to those 5 slices lying immediately above or below the central axial slice in a image set. The analysis begins with tissue classification based on the unsupervised fuzzy-c means (UFCM) algorithm that yields 10 possible output classifications. The authors report that the high number of output classes reduce the changes of misclassify tumor tissue from otherwise normal tissue (WM/GM). The encoded knowledge comprises the distributions derived found from case studies, relating class center intensities to the presence or absence of tissue type. The classification is dependent upon the proximity of tissues with respect to the lateral ventricles. The class centers define "focus of attention" areas in the slice being analyzed, which are used to remove skull tissue and locate WM. Once identified, WM is subjected to a shape analysis to test for abnormalities (tumor detection). With WM identified and presence of tumor tissue accepted or rejected, CSF is then identified followed by GM identification. There is no relative performance measurement reported for this technique since a limited number of slices/patients are analyzed as proof of concept. However, it appears most useful in detecting tumors of size large enough to cause some distortion in the expected shape of the classified WM.

Warfield et al.[19] demonstrate a method that employs an anatomical atlas to segment cortical and sub-cortical structures and distinguish WM lesions. This method subjects the input slice to the 3D diffusion filter previously mentioned to correct for inhomogeneity. The skull is removed semi-automatically and the intracranial tissue is segmented by an EM algorithm. The anatomical atlas is co-registered with a classified 3D image and elastic matching is used to fit anatomical structures to the classified brain. The initial EM classifier and the elastically matched atlas can adequately identify all structures in the brain except for the cortex. The cortex is segmented by the use of a seed growing algorithm that is dependent upon a separate model. With all of the GM structures of the brain thus identified, the WM and any incident lesions are segmented by removing the GM and CSF tissues previously identified. In addition, a two-class minimum distance classifier is used on the identified WM. The performance of the cortex segmentation is compared against 5 different raters and is reported to achieve a 95% success rate against a best rater and 96% accuracy as measured with respect to a "standard" cortex. The method is unique in that it segments all possible GM tissue before attempting to segment WM/WML thus avoiding the problem inherent in all methods that segment WM lesions based on pixel intensity criteria. There is no published information concerning its ability to distinguish WM lesions so the method cannot be judged.

Johnston et al.[20] present an involved method of MS lesion detection that is limited to slices occurring adjacent to the central axial slice as in Li[18] above. This method employs PD and T2 slices and performs 8 bit scaling on the data. The skull is removed and the image with the remaining intracranial tissue is filtered with a non-linear low-pass filter to correct for RF inhomogeneity. A variation of the iterated conditional modes (ICM) algorithm is applied to perform a preliminary 3D segmentation. This step yields a separate 3D image for each tissue type (4) and assigns to each voxel an 8 bit intensity value that represents the probability that the voxel belongs to that tissue class. The method requires initial operator selection of pure tissue samples to generate histograms for each tissue type. From this, neighborhood interaction parameters are found which indicate the strength of interaction between tissue types. The final segmentation is obtained with convergence of the ICM algorithm after 5 to 8 iterations. Misclassifications, due to partial volume effects, force the use of at least two stages of post processing to enhance lesion detection. The first step is the merging of the two (PD & T2) 3D WM probability maps generated by ICM. The second is the re-application of ICM to this merged data set to generate a WM/WM lesion mask allowing the segmentation of lesions from WM without interference from GM intensities. Using a similarity index as in Zijdenbos[10] discussed above, it is reported that the best accuracy, with respect to a manual outlining by an experienced operator, occurs on the 3 most central slices of the data set while decreasing significantly for other slices. This inability to reliably detect across a significant span of slices reduces the usefulness of the technique.

Goldberg-Zimring et al.[2] demonstrate an automated technique using an ANN classifier combined with an anatomical map. This method is built on the assumptions that MS lesions in T2 and PD weighted scans are much brighter than other brain tissue, that non MS regions of the brain will be very large or very small in size, that MS lesions are relatively circular, and that most of the MS lesions occur almost exclusively in the periventricular WM. In operation, the subject image is first normalized so that its maximum pixel intensity is equal to 1. A sliding window thresholder is then applied to the image and returns a "1" for the central pixel of the window if that image pixel has a value greater than 0.5, otherwise is "0". These binary regions are contoured, and the area, perimeter, and shape factor for each is calculated. Contoured areas with shape factors less than 0.2, or that have areas of less than 240 pixels extent are rejected as artifacts. All contoured objects lying within the cortex, or along the hemispherical fissure are also eliminated. This preliminary artifact filtering is supplemented by an ANN with three input and two output channels. Using empirical evidence that most MS lesions have high average pixel intensities coupled with a high shape index, the ANN is trained to reject contoured objects that do not meet the requirements of: 1) high average pixel intensity, 2) high shape factor, 3) high product of shape factor times average intensity. The ANN is supplemented by an unspecified post-processing stage that removed artifacts caused by ANN. The reported sensitivity of 0.87 and specificity of 0.96 for this technique is based on a group of 45 images. The technique produces a vast number of false positive lesions before the application of the ANN and might be significantly improved by employing a more sophisticated thresholding technique. The lack of specification of the final post-processing stage that corrects the ANN output raises some questions about the veracity of the sensitivity and specificity reports.

DeCarli et al.[21] describes a fully automatic global thresholding method for segmenting WM hyperintensities. After application of a diffusion filter to remove RF inhomogeneity, a segmentation[22] of the PD image is performed to identify cerebral cortex, CSF, and brain volumes. PD image pixels representing brain tissue are added to T2 image pixels representing brain tissue and a histogram of the combined images is generated. The histogram is modeled as a Gaussian allowing application of standard statistical moments to the pixel distribution. All pixels having intensities greater than 3 standard deviations above the mean for this distribution are considered to to be WM hyperintensities. A claim is made for significant correlation between lesion load detected in this manner and as outlined by an operator (r=0.83, p<0.001). This is somewhat misleading because this reliability measure is based on the measurement of CSF produced in a previous publication[22] and does not directly relate to the specification of WM lesions reported here.

Brunetti et al.[23-25] present a simple technique ("Quantitative Magnetic Color Imaging") that can be considered fully automated as the operator is only asked to view the final output image. This method employs T1, T2 and PD images and calculates relaxation rate maps for each, based on the selection of different repetition times (TR) parameters during initial image acquisition. These parametric maps are then color coded (red for 1/T1, green for 1/T2, blue for PD) and combined into one multispectral color image. The colored image is displayed using a predefined color map in which the colors directly reflect the calculated parameter values. A violet-blue color on the map indicates suspected lesions. Inter-rater tests, using three raters of different levels of experience, indicate that this technique enhances visual detectability for all observers (k=0.66 with this technique vs k=0.56 for same observer without it). The accuracy of detection, using the kappa statistic, indicate good to substantial agreement for the two less experienced observers as compared to the expert neuroradiologist. This is a unique method, but the required manipulation of MR parameters during image acquisition limits its applicability.

It would be desirable to have a system and/or method for determining volumetric measurements of cerebral regions, automatically or free of subjective intervention by a user. By way of illustration, the instant invention calculates volumetric measurements of subcortical regions of a brain. Advantageously, such calculated volumetric measurements are used, for example, to indicate atrophy during a pathological process. Such a pathological process optionally includes a dementia evidencing a physical change in the brain. For instance, using the instant invention, one can recognized atrophy or volume shrinkage in a hippocampus coincident with an Alzheimer's disease process.

It would be desirable to have a system and/or method for detecting lesion tissue in cerebral regions, automatically or free of subjective intervention by as user. By way of illustration, the instant invention detects lesion tissue in subcortical regions of a brain, which may indicate a dementia, such as, Alzheimer's disease, Parkinson's disease, Huntington's disease, and a purely aging-associated dementia.

It would also be desirable to have a system and/or method of providing a cerebral region template generated from a patient's own morphology. For example, such a template optionally enhances accurate location of regions of interest in the brain and accurate analysis thereof.

4. SUMMARY OF THE INVENTION

It is, therefore, a feature and advantage of the present invention to provide a method and/or system for detecting hyperintense regions in MRI images which addresses the problems associated with human subjectivity and existing thresholding techniques. In particular, the present invention introduces the concept of the use of knowledge guided rules and methods for automatically locating certain anatomical regions and detecting hyperintensities associated with same, which in turn are candidates for possible lesions.

It is another feature and advantage of the present invention to provide a method and/or system for detecting white matter hyperintensities and subcortical hyperintensity regions in MRI images which is designed for high sensitivity, detection and monitoring of subtle (small) brain lesions in patients with neurodegenerative diseases.

It is also a feature and advantage of the present invention to provide an automated method and/or automated system for detecting hyperintensities in MRI images which requires no a priori knowledge of the intensity distributions of image pixels and which does not require any additional direction from an expert operator to perform its task.

Yet another feature and advantage of the present invention is to provide a method and/or system for processing the information and/or data provided by MRI images to detect and identify hyperintensities for disease screening, and thereby serve as a diagnostic aid in helping neuroradiologists verify disease diagnosis and severity, to arrive at a prognosis, or to follow the possible effects of therapy (e.g., drug therapy).

The above features and advantages are accomplished, for example, by an automated, knowledge-guided hyperintensity detection (KGHID) method or system that uses encoded knowledge of brain anatomy and MRI characteristics of individual tissues to reclassify pixels from an initial unsupervised tissue classification.

The method/system herein described optionally requires no more than a reliable initial segmentation of brain tissues into classes of, for example, cerebral spinal fluid, white matter, gray matter and mixed boundary tissue. KGHID is then able to identify subcortical structures and hyperintense lesions using these tissue classes and encoded anatomical knowledge. This knowledge consists of pixel intensity relationships as found in the classified tissues.

Another feature and advantage of this method or system is its ability to detect automatically lesions confined within white matter tissue around the lateral ventricles or within desired subcortical structures. Lesions in these areas are thought to be attributable to various neurodegenerative diseases. The method detects hyperintensities within various tissues in the brain, including but not limited to potential lesions in white matter, a periventricular ring, and possible lesions in lenticular nuclei.

The structures already delineated as part of the analysis form the basis for further implementing lesion detection within the caudate nuclei and the thalamus. In addition, the method/system requires no initial assumptions about the relative health of the brain being analyzed. The present technique has been proven to work with in vivo and in vitro brain images. The method/system of the present invention is preferable applied to axial images. It could also be adapted for use with coronal, sagittal, or like images.

Moreover, since the method/system of the present invention requires no operator intervention nor reference to an anatomical atlas, it is ideally suited to real-time imaging. While the algorithm described herein is written in IDL, a computer language suited to prototyping, it could be easily ported into C or other software languages.

It is a feature and advantage of the instant invention to provide a system and/or method for determining volumetric measurements of cerebral regions, automatically or free of subjective intervention by a user. By way of illustration, the instant invention calculates volumetric measurements of subcortical regions of a brain. Advantageously, such calculated volumetric measurements are used, for example, to indicate atrophy during a pathological process. Such a pathological process optionally includes a dementia evidencing a physical change in the brain. For instance, using the instant invention, I have recognized atrophy or volume shrinkage in a hippocampus coincident with an Alzheimer's disease process.

It is another feature and advantage of the instant invention to provide a system and/or method for detecting lesion tissue in cerebral regions, automatically or free of subjective intervention by as user. By way of illustration, the instant invention detects lesion tissue in subcortical regions of a brain, which may indicate a dementia, such as, Alzheimer's disease, Parkinson's disease, Huntington's disease, and: a purely aging-associated dementia.

It is yet another feature and advantage of the instant invention to provide a system and/or method of providing a cerebral region template generated from a patient's own morphology. For example, such a template optionally enhances accurate location of regions of interest in the brain and accurate analysis thereof.

It is another feature and advantage of the instant invention to provide a system and/or method for performing serial images separated in time to monitor disease progression and/or success of therapy.

More specifically, the instant invention provides a method of interpreting at least one imaging scan of a patient. The method includes the following sequential, non-sequential, or sequence-independent steps. A processor, for example, (a) identifies a location of at least one cerebral region in the imaging scan based, at least in part, on a relative location of a lateral ventricle. The identifying step (a) is free of human intervention and/or is automatic. Advantageously, such a step at least substantially eliminates human subjectivity, which may vary from user to user.

Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans, the identifying step (b) is free of human intervention and/or is automatic. Optionally, the processor (c) determines a volumetric measurement for at least one of the cerebral regions.

Optionally, the processor (d) identifies a suspected presence of white matter lesion tissue in the imaging scan based on a knowledge base relating voxel intensity distributions and a spatial relationship of cerebral anatomical structures.

Optionally, at least one cerebral region includes at least one of a caudate nucleus, a lenticular nucleus, a thalamus, a hippocampus, a periventricular ring, white matter, a brain stem, and a cerebellum.

Optionally, the identifying step (a) includes determining a location of the caudate nucleus, at least in part, from the relative location of the lateral ventricle. Optionally, the identifying step (a) includes determining a location of the thalamus, at least in part, from at least one of a relative location of the caudate nucleus and the relative location of the lateral ventricle. Optionally, the identifying step (a) includes determining a location of the lenticular nucleus, at least in part, from at least one of the relative location of the caudate nucleus and a relative location of the thalamus.

Optionally, the identifying step (a) includes determining a location of the hippocampus, at least in part, from the relative location of the lateral ventricle.

Optionally, the identifying step (a) includes determining a location of the periventricular ring, at least in part from at least one of the location of the lateral ventricle, the location of the caudate nucleus, and the location of the thalamus.

Optionally, the identifying step (d) includes identifying white matter regions in the at least one imaging scan, eliminating therefrom voxels identifiable as at least one of white matter, a perivascular space, and cerebrospinal fluid.

Optionally, the white matter regions include at least one of an internal capsule, a frontal lobe, an anterior temporal lobe, an anterior parietal lobe, a posterior parietal lobe, an occipital lobe, and a posterior temporal lobe.

Optionally, the processor generates a template unique to the patient, the template including each identified at least one cerebral region. Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans, using the generated template.

In accordance with another embodiment of the instant invention, an automated method of identifying suspected lesions in a brain is provided. The method includes the following sequential, non-sequential, sequence-independent steps. A processor (a) provides a magnetic resonance image (MRI) of a patient's head, including a plurality of slices of the patient's head, which MRI comprises a multispectral data set that can be displayed as an image of varying pixel intensities. The processor (b) identifies a brain area within each slice to provide a plurality of masked images of intracranial tissue. The processor (c) applies a segmentation technique to at least one of the masked images to classify the varying pixel intensities into separate groupings, which potentially correspond to different tissue types. The processor (d) refines the initial segmentation into the separate groupings of at least the first masked image obtained from step (c) using one or more knowledge rules that combine pixel intensities with spatial relationships of anatomical structures to locate one or more anatomical regions of the brain. The processor (e) identifies, if present, the one or more anatomical regions of the brain located in step (d) in other masked images obtained from step (c). The processor (f) further refines the resulting knowledge rule-refined images from steps (d) and (e) to locate suspected lesions in the brain.

Optionally, the magnetic resonance image includes a multispectral data set including proton density weighted (PDw), T1 weighted (T1w) and T2 weighted (T2w) acqusitions. Optionally, the slices are taken in the axial, coronal, or sagittal planes of the patient's head. Optionally, the varying pixel intensities are classified into at least four separate groupings, which potentially correspond to at least four different tissue types, including a first tissue type, a second tissue type, a third tissue type, and a fourth tissue type. Optionally, the first tissue type comprises cerebrospinal fluid. Optionally, the second tissue type comprises white matter. Optionally, the third tissue type comprises gray matter. Optionally, the fourth tissue type comprises white matter hyperintensities.

Optionally, the anatomical regions of the brain include at least one of lateral ventricles, caudate nuclei, lenticular nuclei, hippocampus, brain stem, cerebellum, and thalamus.

Optionally, the suspected lesions include hyperintense lesions embedded within the white matter. Optionally, the suspected lesions comprise a pertiventricular ring.

In accordance with another embodiment of the instant invention, an apparatus for interpreting at least one imaging scan of a patient is provided. The apparatus includes (a) first means for identifying a location of at least one cerebral region in the imaging scan based, at least in part, on a relative location of a lateral ventricle. The first identifying means (a) is free of human intervention.

Optionally, the at least one imaging scan includes a plurality of consecutive imaging scans. Optionally, the apparatus further includes (b) second means for identifying a location of each cerebral region of the at least one cerebral region in a successive imaging scan of the plurality of imaging scans based, at least in part, on a location of a corresponding cerebral region in a preceding imaging scan of the plurality of imaging scans. The second identifying means (b) is free of human intervention.

Optionally, the apparatus includes (c) means for determining a volumetric measurement for at least one of the each cerebral region. Optionally, the apparatus includes (d) third means for identifying a suspected presence of white matter lesion tissue in the imaging scan based on a knowledge base relating voxel intensity distributions and a spatial relationship of cerebral anatomical structures. Optionally, at least one cerebral region includes at least one of a caudate nucleus, a lenticular nucleus, a thalamus, a hippocampus, a periventricular ring, white matter, a brain stem, and a cerebellum.

Optionally, the first identifying means (a) includes means for determining a location of the caudate nucleus, at least in part, from the relative location of the lateral ventricle. Optionally, the first identifying means (a) includes means for determining a location of the thalamus, at least in part, from at least one of a relative location of the caudate nucleus and the relative location of the lateral ventricle. Optionally, the first identifying means (a) includes means for determining a location of the lenticular nucleus, at least in pat, from at least one of the relative location of the caudate nucleus and a relative location of the thalamus. Optionally, the first identifying means (a) includes means for determining a location of the hippocampus, at least in part, from the relative location of the lateral ventricle. Optionally, the first identifying means (a) includes means for determining a location of the periventricular ring, at least in part from at least one of the location of the lateral ventricle, the location of the caudate nucleus, and the location of the thalamus.

Optionally, the third identifying means d) includes means for identifying white matter regions in the at least one imaging scan, eliminating therefrom voxels identifiable as at least one of white matter, a perivascular space, and cerebrospinal fluid. Optionally, the white matter regions include at least one of an internal capsule, a frontal lobe, an anterior temporal lobe, an anterior parietal lobe, a posterior parietal lobe, an occipital lobe, and a posterior temporal lobe.

Optionally, the apparatus includes means for generating a template unique to the patient, the template including each identified at least one cerebral region. Optionally, the at least one imaging scan includes a plurality of consecutive imaging scans. The apparatus optionally further include (b) fourth means for identifying a location of each cerebral region of the at least one cerebral region in a successive imaging scan of the plurality of imaging scans based, at least in part, on a location of a corresponding cerebral region in a preceding imaging scan of the plurality of imaging scans, using the generated template.

In accordance with another embodiment of the instant invention, a computer readable medium including instructions being executed by a computer is provided. The instructions instruct the computer to execute an interpretation of at least one imaging scan of a patient. The instructions include the following sequential, non-sequential, or sequence-independent steps. A processor (a) identifies a location of at least one cerebral region in the imaging scan based, at least in part, on a relative location of a lateral ventricle. The identifying instruction (a) is free of human intervention.

Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans. The identifying instruction (b) is free of human intervention.

Optionally, the processor (c) determines a volumetric measurement for at least one of the each cerebral region.

Optionally, the processor (d) identifies a suspected presence of white matter lesion tissue in the imaging scan based on a knowledge base relating voxel intensity distributions and a spatial relationship of cerebral anatomical structures.

Optionally, at least one cerebral region includes at least one of a caudate nucleus, a lenticular nucleus, a thalamus, a hippocampus, a periventricular ring, white matter, a brain stem, and a cerebellum. Optionally, the identifying instruction (a) includes determining a location of the caudate nucleus, at least in part, from the relative location of the lateral ventricle. Optionally, the identifying instruction (a) includes determining a location of the thalamus, at least in part, from at least one of a relative location of the caudate nucleus and the relative location of the lateral ventricle. Optionally, the identifying instruction (a) includes determining a location of the lenticular nucleus, at least in part, from at least one of the relative location of the caudate nucleus and a relative location of the thalamus. Optionally, the identifying instruction (a) includes determining a location of the hippocampus, at least in part, from the relative location of the lateral ventricle. Optionally, the identifying instruction (a) includes determining a location of the periventricular ring, at least in part from at least one of the location of the lateral ventricle, the location of the caudate nucleus, and the location of the thalamus.

Optionally, the identifying instruction (d) includes identifying white matter regions in the at least one imaging scan, eliminating therefrom voxels identifiable as at least one of white matter, a perivascular space, and cerebrospinal fluid. Optionally, the white matter regions include at least one of an internal capsule, a frontal lobe, an anterior temporal lobe, an anterior parietal lobe, a posterior parietal lobe, an occipital lobe, and a posterior temporal lobe.

Optionally, the processor generates a template unique to the patient, the template including each identified at least one cerebral region. Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans, using the generated template.

In accordance with another embodiment of the instant invention, a computer system for interpreting at least one imaging scan of a patient is provided. The computer system includes a processor. The computer system also includes a memory storing a computer program controlling operation of the processor. The program includes instructions for causing the processor to effect the following sequential, non-sequential, or sequence-independent steps. The processor (a) identifies a location of at least one cerebral region in the imaging scan based, at least in part, on a relative location of a lateral ventricle. The identifying instruction (a) is free of human intervention.

Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans. The identifying instruction (b) is free of human intervention. Optionally, the processor (c) determines a volumetric measurement for at least one of the each cerebral region.

Optionally, the processor (d) identifies la suspected presence of white matter lesion tissue in the imaging scan based on a knowledge base relating voxel intensity distributions and a spatial relationship of cerebral anatomical structures.

Optionally, at least one cerebral region includes at least one of a caudate nucleus, a lenticular nucleus, a thalamus, a hippocampus, a periventricular ring, white matter, a brain stem, and a cerebellum. Optionally, the identifying instruction (a) includes determining a location of the caudate nucleus, at least in part, from the relative location of the lateral ventricle. Optionally, the identifying instruction (a) includes determining a location of the thalamus, at least in part, from at least one of a relative location of the caudate nucleus and the relative location of the lateral ventricle. Optionally, the identifying instruction (a) includes determining a location of the lenticular nucleus, at least in part, from at least one of the relative location of the caudate nucleus and a relative location of the thalamus. Optionally, the identifying instruction (a) includes determining a location of the hippocampus, at least in part, from the relative location of the lateral ventricle. Optionally, the identifying instruction (a) includes determining a location of the periventricular ring, at least in part from at least one of the location of the lateral ventricle, the location of the caudate nucleus, and the location of the thalamus.

Optionally, the identifying instruction (d) includes identifying white matter regions in the at least one imaging scan, eliminating therefrom voxels identifiable as at least one of white matter, a perivascular space, and cerebrospinal fluid. Optionally, the white matter regions include at least one of an internal capsule, a frontal lobe, an anterior temporal lobe, an anterior parietal lobe, a posterior parietal lobe, an occipital lobe, and a posterior temporal lobe.

Optionally, the processor generates a template unique to the patient, the template including each identified at least one cerebral region. Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans, using the generated template.

Optionally, the computer system includes a computer including the processor. The computer is optionally communicatable with a user via a computer network. Optionally, the computer includes a Web server.

In accordance with another embodiment of the instant invention, an internet appliance is provided. The internet appliance includes a thin client programmably connected via a computer network to a single web hosting facility. The single web hosting facility includes a server communicatable with a user via said thin client. The server is in communication with a processor and a computer readable medium including instructions being executed by a processor.

The instructions instruct the computer to execute an interpretation of at least one imaging scan of a patient. The instructions includes the following sequential, non-sequential, or sequence-independent steps. The processor (a) identifies a location of at least one cerebral region in the imaging scan based, at least in pat, on a relative location of a lateral ventricle. The identifying instruction (a) is free of human intervention.

Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans. The identifying instruction (b) is free of human intervention. Optionally, the processor (c) determines a volumetric measurement for at least one of the each cerebral region.

Optionally, the processor (d) identifies a suspected presence of white matter lesion tissue in the imaging scan based on a knowledge base relating voxel intensity distributions and a spatial relationship of cerebral anatomical structures.

Optionally, the at least one cerebral region includes at least one of a caudate nucleus, a lenticular nucleus, a thalamus, a hippocampus, a periventricular ring, white matter, a brain stem, and a cerebellum. Optionally, the identifying instruction (a) includes determining a location of the caudate nucleus, at least in part, from the relative location of the lateral ventricle. Optionally, the identifying instruction (a) includes determining a location of the thalamus, at least in part, from at least one of a relative location of the caudate nucleus and the relative location of the lateral ventricle. Optionally, the identifying instruction (a) includes determining a location of the lenticular nucleus, at least in part, from at least one of the relative location of the caudate nucleus and a relative location of the thalamus. Optionally, the identifying instruction (a) includes determining a location of the hippocampus, at least in part, from the relative location of the lateral ventricle.

Optionally, the identifying instruction (a) includes determining a location of the periventricular ring, at least in part from at least one of the location of the lateral ventricle, the location of the caudate nucleus, and the location of the thalamus.

Optionally, the identifying instruction (d) includes identifying white matter regions in the at least one imaging scan, eliminating therefrom voxels identifiable as at least one of white matter, a perivascular space, and cerebrospinal fluid. Optionally, the white matter regions include at least one of an internal capsule, a frontal lobe, an anterior temporal lobe, an anterior parietal lobe, a posterior parietal lobe, an occipital lobe, and a posterior temporal lobe.

Optionally, the processor generates a template unique to the patient, the template including each identified at least one cerebral region. Optionally, the at least one imaging scan includes a plurality of consecutive imaging scans. Optionally, the processor (b) identifies a location of each cerebral region of the at least one cerebral region in a successive imaging scan of the plurality of imaging scans based, at least in part, on a location of a corresponding cerebral region in a preceding imaging scan of the plurality of imaging scans, using the generated template.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter forming a part hereof, wherein like numerals refer to like elements throughout, and in which there is illustrated preferred embodiments of the invention.

5. BRIEF DESCRIPTION OF THE DRAWINGS

FIG. 1 is a sample intensity distribution graph for pixels or voxels relating to white matter hyperintensities in a proton density weighted data acquisition;

FIG. 2 is a sample, axial MRI scan of a patient's head;

FIG. 3 is a sample, axial MRI scan, showing at least a lateral ventricle;

FIG. 4 is a sample, axial MRI scan, showing at least caudate nuclei and lenticular nuclei;

FIG. 5 is a sample, axial MRI scan, showing at least a periventricular ring;

FIG. 6 is a sample, axial MRI scan; showing at least hyperintense lesions embedded within white matter;

FIG. 7 is a sample, axial MRI scan, showing at least VGC segmentation of gray matter and white matter hyperintensities;

FIG. 8 is sample, axial MRI scan, showing lesion detection output consistent with the instant invention;

FIG. 14 is an illustrative embodiment of a computer network architecture consistent with the instant invention.

6. NOTATIONS AND NOMENCLATURE

Figure 9:
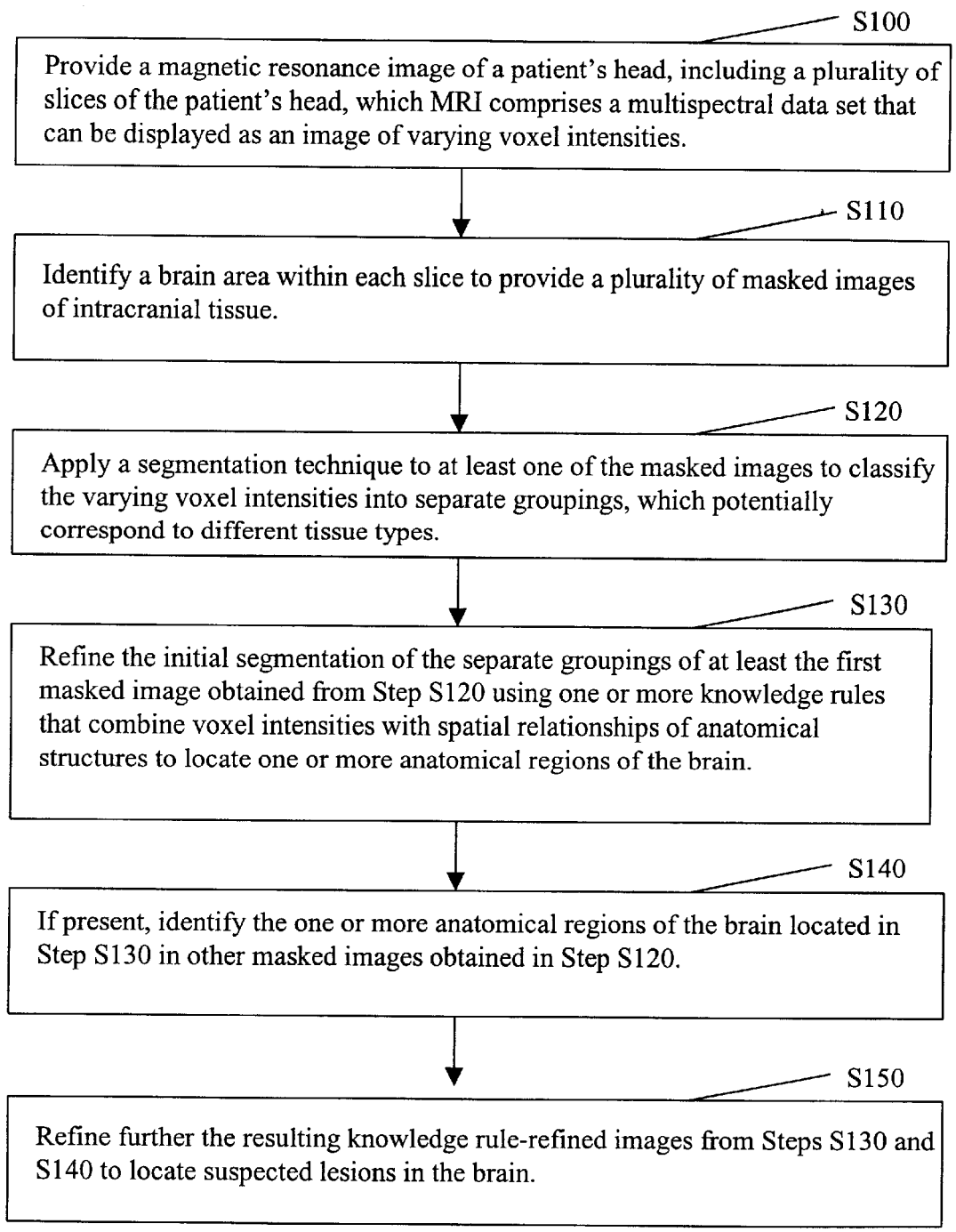
FIG. 9 is an illustrative embodiment of a flowchart consistent with the instant invention.

The detailed description that follows may be presented in terms of program procedures executed on a computer or network of computers. These procedural descriptions and to representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily; these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers or the like. It should be noted, however that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

7. DETAILED DESCRIPTION OF THE PREFERRED EMBODIMENTS

In accordance with an embodiment of the present invention, an automated method of identifying suspected lesions in a brain is provided, which comprises: (a) providing a magnetic resonance image ("MRI") of a patient's head, including a plurality of slices of the patient's head, which MRI comprises a multispectral data set that can be displayed as an image of varying pixel intensities; (b) identifying a brain area within each slice to provide a plurality of masked images of intracranial tissue; (c) applying a segmentation technique to at least one of the masked images to classify the varying pixel intensities into separate groupings, which potentially correspond to different tissue types; (d) refining the initial segmentation into the separate groupings of at least the first masked image obtained from step (c) using one or more knowledge rules that combine pixel intensities with spatial relationships of anatomical structures to locate one or more anatomical regions of the brain; (e) if present, identifying the one or more anatomical regions of the brain located in step (d) in other masked images obtained from step (c); (f) further refining the resulting knowledge rule-refined images from steps (d) and (e) to locate suspected lesions in the brain.

In a particular embodiment of the invention, the magnetic resonance image comprises a multispectral data set including proton density weighted (PDw), T1 weighted (T1w) and T2 weighted (T2w) acqusitions, and the slices are taken in the axial, coronal, or sagittal planes of the patient's head.

The varying pixel intensities may be classified into a number of, preferably at least four, separate groupings, which potentially correspond to at least four different tissue types, including a first tissue type, a second tissue type, a third tissue type, and a fourth tissue type. In an embodiment of the instant invention, the first tissue type comprises cerebrospinal fluid ("CSF"), the second tissue type comprises white matter ("WM"), the third tissue type comprises gray matter ("GM"), and the fourth tissue type comprises white matter hyperintensities ("WMHI"). The anatomical regions of the brain, which can be automatically located by the present method, include, but are not limited to, lateral ventricles, caudate nuclei, lenticular nuclei, or thalamus. Consequently, suspected lesions can be detected which comprise hyperintense lesions embedded within the white matter or which may comprise a periventricular ring.

In a particular method of the invention, further refinement of the resulting knowledge rule-refined images of at least the third and fourth tissue types is carried out. Suspected lesions can be identified in subcortical regions using the present automated technique.

The present invention comprises an automated technique to segment WM hyperintense lesion using T1, T2 and PD images. (See, Gosche et al.[5], incorporated in its entirety by reference herein.) The present method begins by using a multiple threshold technique to remove the skull pixels from the image. The resulting multispectral data is submitted to a data clustering tool that utilizes FCM and a cluster partition validity index to recursively refine the tissue classification in the image. The cluster output consists of WM, GM, CSF and a fourth tissue type which contains, in part, the WM hyperintense lesions. The detection algorithm uses anatomical and empirical knowledge to selectively identify and analyze the subcortical structures (e.g., thalamus and basal ganglia) for lesion involvement. Further, it employs spatial reasoning based on the defined brain anatomy and statistical thresholding to detect and segment WM lesions. Only preliminary results are available. Kappa statistic indicates substantial agreement when compared to an expert neuroradiologist for a limited set of cases.

Further enhancements of the present method are apparent from the discussion presented herein. For instance, the present method can be enhanced by incorporating the anisotropic filter mentioned in Wicks[26], some variant of the CSF based intensity correction described by Mitchell[11], and possibly the histogram matching method of Wang[8]. Addition of these techniques may increase the robustness of the algorithm and perhaps decrease its report of false positives. For future development, it would be useful to identify and localize lesions confined within known macroscopic anatomy of the brain, such as lobar confinement. Also, it may be advantageous to combine the information of lesion severity or location with the known symptoms of pathway interference by these lesions, therefore creating a focused diagnostic tool to indicate the likelihood of lesion correlation with displayed symptoms of AD. Additionally, the algorithm can be enhanced by incorporating a database to capture past and present measures, therefore becoming useful in serial studies or to validate results of drug trials.

The knowledge rules of the present invention comprise factors taking into account pixel intensity and spatial relationships of anatomical features. The knowledge rules may also utilize results of initial segmentation programs, including conventional segmentation techniques.

7.1 OVERVIEW

Bright regions on magnetic resonance images (MRI) of the brain, known as white matter hyperintensities (WMHI), have been associated with normal cognitive decline (Boone et al., 1992; Ylikoski et al., 1993 Mirsen et al., 1001) as well as the neurodegenerative disease in patients (Sullivan et al., 1990; Leifer et al., 1990; Filippi et al., 1995). Previous studies have used computerized methods, such as region of interest tracing (Kitaki et al., 1997) and threshold determination (Decarli et al., 1995; MacKay et al., 1996), to quantify WMHI. These methods rely on either human supervision with inherent subjectivity or global thresholding in which results depend heavily on selected thresholds.

Recent advances in MRI segmentation techniques have significantly improved the separation of different tissue types in the MRI, data (Bezdek et al., 1993, Clarke et al., 1995; Bensaid et al., 1996; Vaidyanathan et al., 1997; Clark et al.,1998). Bensaid et al. (1996) introduced a variation on fuzzy c-means ("FMC") called validity-guided clustering ("VGC"), which is suitable for the discovery of small clusters. Knowledge in the form of an atlas (Karber et al., 1996), region adjacency graphs (Sonka et al. 1996), and rules in an expert system (Clark et al., 1998) has successfully been used for brain MRI segmentation for a variety of diseases. Advancements in knowledge-guided algorithms can contribute not only to increased scientific knowledge of disease etiologies, but may also aid the clinician in differential diagnosis or in the early detection of lesions before the patient is symptomatic.

I describe hereinbelow a knowledge-guided tissue classification algorithm, called knowledge-guided hyperintensity detection ("KGHID"). This method is optimized to detect brain hyperintensities that are believed to be relevant to the clinical expression of Alzheimer's disease (AD: McKhann et al., 1984). However, it is likely applicable to a variety of other brain diseases, such as multiple sclerosis (Filippi et al., 1995). KGHID uses VGC to develop a preliminary image segmentation (Bensaid et al., 1996). It then uses encoded knowledge of the anatomy of the brain to refine the tissue classification and complete the detection and segmentation of the hyperintense brain lesions. I apply the method to an example case, comparing its results with other computerized methods (Kitagaki et al., 1997; Decarli et al., 1995; MacKay et al., 1996).

7.2 IMAGE ACQUISITION AND PREPROCESSING

7.2.1 MRI Data Acquisition

A complete MRI of the brain including images in the axial, coronal, and sagittal planes, is acquired on a 1.5 Tesla Signa Advantage scanner (GE Medical Systems, Milwaukee, Wis.). The multispectral MRI dataset for each brain slice consists of proton density weighted (Pdw) (TR/$TE_{eff}$550/27 msec), and T2 weighted (T2w) (TR/$TE_{eff}$3,000/102.2 msec) acquisitions with an acquisition matrix of 256×192, a field of view of 22 cm, and a slice thickness of 5 mm. During imaging, patients are aligned in approximately the same position with the main head axes aligned with the imaging planes of the MR system and are stabilized in the head coil with foam pads. Image coregistration is verified and visually evaluated and no correction is needed.

Analyzed images are obtained in the axial plan, where the first of nine consecutive slices are identified by the concurrent presence of the lateral ventricle, thalamus, basal ganglia (e.g., head of the caudate and lenticular nuclei), and the genu of the corpus callosum (see, e.g., FIG. 2). The selected volume, generally just superior to the eye orbit through to the apex of the brain, allows maximum exposure to white matter while minimizing the effects of the extraneous tissue.

7.2.2 Presegmentation Processing

After data acquisitions, but, for example, before any segmentation or knowledge-guided processing occurs, using the instant invention, one can automatically identify the brain area from the images. The unsupervised masking of the intracranial tissue is empirically developed. It uses a logarithmic transformation of the gray values in the Pdw slice to effect a better separation of the dark background pixels from the brighter pixels of the imaged head. Once each pixel in the raw Pdw image is replaced by its natural logarithm, the image is thresholded by retaining only those pixels that constitute the top 30% of the intensities in this image, the rest being set to value zero. This step has shown to result in a reliable mask for the whole head. With the background removed, the intensities of the Pdw image are now shifted lower in value by effectively dividing the image intensities by a factor of 10 and then replacing each pixel by its natural logarithm. These steps serve to move the darkest pixel in the original Pdw image to zero so that the natural boundary between the skull and intracranial tissue can be more easily found with a simple threshold. The image is then thresholded such that the lowest 30% of the resulting intensities are set to zero. A region labeling algorithm is now applied to the result followed by an erosion operation ensuring that any imaged tissue connecting the skull and brain not removed during thresholding is severed. Once these residual tissue fragments are removed, the final mask is created by applying a dilation operation to the remaining pixels. The resulting dilation is converted to a binary image and applied as a multiplicative mask to the original multispectral image set (Pdw, T2w, T1w). This process is repeated for each of the nine consecutive slices acquired for each patient, since the brain area may vary with the slice.

The following optional final step in the unsupervised masking is executed if the previous steps did not result in an adequate brain segmentation. The success or failure is judged by a simple measurement of the masked brain area. Based on the AD cases in my dataset, the desired intracranial mask, for example, comprise from about 65% to about 83% of the total image area in a 256×256 pixel image with a 22 cm field of view. Any deviation from this range at the end of the first stage leads to several iterations with small incremental adjustments in threshold values until a mask with area less than 83% of the whole head for that slice is obtained.

The masking technique described above provides an automatic and unsupervised means for providing masked images to the VGC module. Some parametric adjustments may be needed to apply this technique to other data sets, but this masking technique works reliably and without operator intervention on the data sets used in this laboratory.

7.2.3 VGC

The VGC algorithm (Bensaid et al., 1996) is an enhanced version of FCM. FCM is an iterative clustering algorithm that finds a cluster center for each class (Bezdek et a., 1993). The optimization procedure in FCM inherently leads to classes that are approximately of the same size, and the resulting segmentation may not be anatomically meaningful (Velthuizen et al., 1995). Bensaid et al (1996) developed a refinement of FCM using a validity measure called VGC. The validity measure is essentially a fuzzy and normalized version of the Wilk's lambda statistic, which is used in linear discriminant analysis (Devijver and Kittler, 1982). VGC operates on the output of FCM and iteratively tries to improve the validity of the partitioning by splitting and merging clusters. At each iteration, the modified partition is evaluated and is retained if it constitutes an improvement. This method has been applied successfully to brain tumor images (Valthuizen, 1995). Because of its capability to detect small classes, VGC is a suitable clustering tool for application to MRI hyperintensities.

In an embodiment, although not every embodiment, of the instant invention, I apply VGC to the masked image sets and search for four classes: cerebrospinal fluid (CSF: 1st class), white matter (WM; 2nd class), gray matter (GM; 3rd class), and a fourth class tissue type composed partially of WMHI. Although VGC differentiates the four classes better than FCM, it is not effective in producing a reliable segmentation of the hyperintensities. The WMHI lesions vary in intensity over the image, which can be understood as partial volume effects, and some image nonuniformity due to the characteristics of the MRI coil (Wicks et al., 1992).

Both FCM and VGC rely solely on the pixel intensities in the image, while the radiologists's perception is guided by the anatomical positions of the brightness levels. For this reason, I developed an automated knowledge-guided method that utilizes the initial segmentation of the four different tissue types from VGC to locate various anatomical regions of the brain. With these locations, KGHID then further refines the third (GM) and fourth tissue classifications to isolate the (suspected) lesion tissue. Integrated into the KGHID software is knowledge concerning the relative likelihood of lesion tissue occurring in the locations being analyzed, resulting in a more effective identification of possible lesions regardless of their underlying pixel intensity variations or size.

7.2.4. The Knowledge-Guided Algorithm

The initial segmentation obtained by application of VGC to the masked data is refined by KGHID. The knowledge rules of KGHID are based on intensities combined with the spatial relationship of anatomical structures.

MRI pixel intensities vary greatly from one patient to the next and can also exhibit significant interslice variation within the same patient (Wicks et al., 1992). Since the image data have a high signal-to-noise ratio, the distributions of intensities for each cluster approximate Gaussians (Bernstein et al., 1989; Henkelman, 1985; Parker et al., 1987; Gudbjartsson and Platz, 1995), as illustrated, by way of example, in FIG. 1. Z-scores (Zar, 996) are then a meaningful measure of the intensity distributions.

$$Z_c(I_k) = (I_k - \mu_{ck})/k = T1w, Pdw, T2w; 1 \leq c \leq 4$$

where $I_k$ is the pixel intensity in the $k^{th}$ spectral image, $\mu^{o'}_{ck}$ and $_{ck} Z_4(I_{PDW})$, and $Z_2(I_{T1w})$ scores are used in specific rules described below.

KGHID analyses begin with the identification of the lateral ventricles, caudate nuclei, lenticular nuclei, and the thalamus in the first image of each patient case. To aid the interpretation of the following discussion, relevant structures are identified in FIG. 2. Once identified, the locations of these structures are used to identify their possible presence in subsequent slices. Details of these localization procedures are discussed and illustrated below.

7.2.5. Lateral Ventricles,

Localization of the lateral ventricles begins by applying an iterative region growing operation to an initial seed of 1 pixel positioned at the midpoint of the intracranial tissue, calculated as the point in the image that represents the average x and y coordinates of the tissue. With each growing iteration, horizontal lines are generated, initially 50 pixels in length and stacked in single-pixel layer increments in the y direction. With the generation of each new line, the length is adjusted in the x direction, limited by the most lateral occurrences of CSF that lie medial to the WM comprising the internal capsules. The extension in the y direction continues until WM pixels are detected (the genu and splenium of the corpus callosum). This region-growing process creates a mask that roughly resembles the shape of the lateral ventricles.

CSF pixels identified by the VGC segmentation are grouped into regions by a region-labeling operation (Russ, 1995) (also known as "blobbing"). The ventricular CSF comprising the lateral ventricles is identified and isolated as those regions that have a nonempty intersection of these regions with the mask just generated, for example, as shown in FIG. 2. In FIG. 2, Lateral ventricle (yellow). Relevant structure labels are as follows: 1) lateral ventricles (yellow); 2) thalamus; 3) basal ganglia (occurs bilaterally and includes the lenticular nuclei and head of the caudate nuclei); 4) genu of the corpus callosum; 5) internal capsule (occurs bilaterally); 6) external capsule (occurs bilaterally).

The lateral ventricle is divided both vertically and horizontally, guided by its anatomical shape. The vertical division is defined as the midpoint between its maximum and minimum location with respect to the x-axis. The horizontal division occurs where its width is minimum. To assist in the localization of the caudate and lenticular nuclei, the upper half of the lateral ventricle is further divided into three distinct regions defined as superior, central, and inferior to the caudate curvatures, for example, as shown in FIG. 3. These curvatures, occurring bilaterally with respect to the vertical division, appear as concave regions in the exterior wall of the lateral ventricle.

As shown by way of example in FIG. 2, the lateral ventricle divided as superior (green), central (red), and interior (yellow) to the caudate curvatures the nuclei are grouped with respect to their y-coordinates. Each subgroup of pixels then represents a horizontal line extending from the medial edge outward. Individual subgroups are analyzed by searching for the occurrence of WM in the vicinity of a (roughly vertical) line joining the maximum x-coordinates of the superior and inferior borders. To account for any missing expected WM within these subgroups, a spline curve is fit to those subgroups in which WM is found, thus fixing the lateral edge of the caudate nuclei, for example, as shown in FIG. 4.

The superior border of each curvature is defined by the point where the x-coordinates of the pixels comprising the lateral ventricle reach their absolute maximum distances from the vertical dividing line. The inferior border is defined by the presence of the thalamostriate vein immediately adjacent to the wall of the lateral ventricles and by 4th class z-scores indicating pixels with bright appearance on the T2w and Pdw images. The central region of the caudate curvature is then defined as the area between its superior and inferior borders.

7.2.6. Caudate Nuclei

The caudate nuclei are identified as segmented clusters of GM and 4th class tissue located immediately adjacent to and confined within the central region of the caudate curvatures defined above. While the medial edge and body of each nucleus are defined solely by their locations within their respective curvatures, the lateral edges occur where their tissues converge with the WM comprising the internal capsule. To find this edge, pixels comprising the nuclei are grouped with respect to their y-coordinates. Each subgroup of pixels then represents a horizontal line extending from the medial edge outward. Individual subgroups are analyzed by searching for the occurrence of WM in the vicinity of a roughly vertical line joining the maximum x-coordinates of the superior and inferior borders. To account for any missing expected WM within these subgroups, a spline curve is fit to those subgroups in which WM is found, thus fixing the lateral edge of the caudate nuclei, as shown, by way of example, in FIG. 4.

7.2.7. Lenticular Nuclei

The lenticular nuclei are identified using knowledge of their bilateral locations, positioned generally lateral and slightly inferior to the caudate nuclei as viewed in the axial plane. These nuclei are clusters composed of GM and 4th class tissue that are bordered by WM pixels making up the internal and external capsules, as shown, by way of example, in FIG. 4. The demarcation of the lenticular nuclei from the surrounding WM is accomplished in a manner that is similar to the method used to depict the lateral edge of the caudate nuclei. Lesions confined within the lenticular nuclei are identified as small clusters of hyperintense tissue with 4th class pixel z-scores indicating their bright appearance on the T2w and PDw images, as shown by way of example, in FIG. 4.

7.2.8. Thalamus

Viewed in the axial plane, the thalamus is identified as segmented clusters of GM and 4th class tissue bilaterally positioned inferior to the lower edge of the caudate curvatures and immediately adjacent to the lateral ventricle. Clusters of GM and 4th class tissue, identified by VGC segmentation, are grouped by region labeling. The thalamus is identified as the intersection of these regions with the confined area of interest.

7.2.9. Periventricular Ring

With the delineation of ventricles and nuclei, KGHID proceeds to classify lesion tissue in the image beginning with the periventricular ring. These lesions are identified by iteratively applying a morphological dilation operator (Haralick et al., 1986) to the previously defined edge of the lateral ventricle. Each dilation generates a single pixel ring around the previous single layer. During each iteration, all pixels identified as caudate nuclei and thalamus are removed from the single pixel ring and the remaining pixels are judged for suitability as lesion tissue via their respective 4th class z-scores of the PDw and T2w images. The dilation process continues until all pixels contained within the final single layer are identified as WM by the original VGC segmentation or 4th class z-scores indicating their hypointense appearance on the PDw and T2w images, as shown, by way of example, in FIG. 5.

7.2.10. Hyperintense WM Lesions

With the accumulation of the brain structure information outlined above, KGHID identifies WMHI contained entirely within regions identified as WM. Using the original masked image representing the intracranial region, the effects of CFG confined within the sulci and the GM tissue immediately surrounding these pockets of CSF are removed. The image of the remaining intracranial tissue is subjected to an iterative morphological erosion operator are returned to the eroding image. The erosion process continues until all pixels in the final layer are identified as either WM by the original VGC segmentation, pixels comprising the border between GM and WM with low 4th class z-scores in the PDw and T2w images, or pixels making up the lateral borders of the lenticular nuclei.

From this resultant image, all pixels identified as lateral ventricle, thalamus, caudate nuclei, lenticular nuclei, or the preiventricular ring are removed leaving only the WM tissue and possible hyperintense lesions embedded within it. To isolate these lesions, all pixels identifiable as WM are removed. The resultant clusters on pixels, comprised primarily of 4th class tissue, are individually analyzed via 4th class z-scores derived from the PDw and T2w images to determine their eligibility as WMHI lesions. Large clusters (e.g., 10 or more pixels) are divided, if required, into separate regions by excluding hypointense embedded pixels with low 4th class z-scores indicating WM on the PDw and T2W images. Pixel clusters are removed from further consideration as WMHI lesions if not surrounded primarily by WM identified either by VGC segmentation or pixels with z-scores indicating WM on the PDw and T2w images. In addition, pixel clusters representing perivascular spaces, with z-scores in the second class that possibly represent the hypointensities of CSF on the T2w image, are also removed.

The remaining regions in the image are subjected to a geometrical shape analysis which judges their circularity by forming the quotient of the cluster area divided by the square of the cluster perimeter (Jahne, 1995; Castleman, 1996). This measure of circularity is insensitive to cluster size, and is a number ranging from $1/(4\pi)$ for a perfect circle, becoming substantially smaller as the cluster becomes more elongated. Clusters deemed essentially linear in shape are rejected from further analysis. The prevailing clusters are then identified as tissue comprising WMHI lesions, as shown, by way of example, in FIG. 6.

7.2.11. Results

In order to demonstrate the performance of KGHID, a simple comparison in a typical case is made between KGHID's final results and the original segmentation results for 3rd and 4th class tissues as determined by VGC. These comparisons illustrate the effect of KGHID and its knowledge-guided method of detection in the reclassification of the VGC segmentation into anatomical structures and lesion tissue.

TABLE I

Results of computerized methods compared with ground truth.
Note: Statistics are the average of the nine slices in the example patient data.

| Method | Sensitivity | Specificity | Kappa |
| --- | --- | --- | --- |
| KGHID | 86% | 92% | 0.84 |
| Thresholding | 31% | 88% | 0.09 |
| Region of Interest | 32% | 81% | 0.10 |
| Region of interest | 38% | 84% | 0.13 |

Table I presents the nine-slice average for sensitivity (Metz, 1978), specificity (Metz, 1978), and kappa (Cohen, 1960) statistics of the results generated by KGHID, region of interest, and thresh-holding methods as compared to ground truth determined by an experienced neuroradiologist (FRM). As shown, the sensitivity of KGHID is at least twice as great as that of the other methods, thus ensuring greater confidence in its ability to make true positive detections. Similarly, the relatively high specificity of KGHID ensures a low number of false positive detections. Finally, the kappa value shows that KGHID is in high agreement with the ground trust image (Landis and Koch, 1977).

The comparison between KGHID and the segmentation results of VGC illustrates the advantage of my knowledge-guided algorithm. As shown, by way of example, in FIG. 7, the 3rd (GM) and 4th class segmentation results from VGC are presented. Third and fourth class tissue consists of GM, WMHI, the preiventricular ring, WM/GM border tissue, and tissue not otherwise classified as CSF or WM. For comparison, the final results of the KGHID algorithm lesion detection are presented, by way of illustration, in FIG. 8.

One limitation of VGC is its inability to effectively separate small lesion areas that lie in close proximity to one another or that are adjacent to tissue type boundaries. Increasing the number of classification bins from four to five causes VGC to split the lesion tissue among three (or more) competing classes without a clear advantage to further analysis. For this reason, segmentation by VGC is limited to four tissue classes. KGHID uses the 3rd and 4th class tissue of VGC and encoded brain anatomy to extract hyperintense lesion tissues. The anatomical decision criteria are based upon extensive consultations with neuroradiologists and empirical refinement, thus contributing to a confident reclassification of lesion tissues from within these two rather broad categories.

TABLE II

Redistribution of pixels by KGHID after initial VGC segmentation.

| KGHID/VGC | 1st Class | 2nd Class | 3rd Class | 4th Class |
|---|---|---|---|---|
| CSF | 3656 | 0 | 0 | 0 |
| WM | 0 | 7208 | 7208 | 12 |
| GM | 24 | 46 | 3527 | 5278 |
| Lesions | 0 | 0 | 201 | 327 |

TABLE III

KGHID anatomical structure classifications (No. of pixels).

| Structure/VGC Class | 1st Class | 3rd Class | 4th Class |
|---|---|---|---|
| Lateral ventricle | 2306 | | |
| Caudate nuclei | | 113 | 259 |
| Lenticular nuclei | | 208 | 238 |
| Thalamus | | 43 | 101 |
| Periventricular ring | | 174 | 116 |
| WMHI | | 0 | 53 |
| Basal ganglia lesion | | 27 | 158 |

To illustrate this reclassification, the effect of KGHID on the VGC segmentation is shown in Tables II and III. Table II shows the distribution of the pixels in each of the VGC classes over the final KGHID assignments. The WMHI, preiventricular ring, and basal ganglia lesions make up the class of "lesions." Since KGHID is designed to detect and accurately segment WMHI, the majority of pixel reassignments occur in VGC's 4th class and consequently the KGHID lesion class.

Table III shows the distribution of VGC classes over the labeled anatomical structures. It is immediately apparent that the anatomical structures are very small (e.g., less than a percent of the pixels in an image) and are unlikely to be detected with a global segmentation method. Table III also shows that the composition of the structures in terms of VGC classes varies. KGHID takes advantage of local characteristics in the immediate neighborhood of the structures to differentiate tissues, rather than relying solely on MRI intensities.

As indicated by the results above, KGHID demonstrates several advantages over other computerized techniques. To be useful, these techniques must exhibit reasonable sensitivity, specificity, and agreement with expert judgment. As shown in Table I, only KGHID demonstrates adequate agreement with the judgment of an expert radiologist.

As compared with the undifferentiated VGC segmentation, KGHID shows a clear advantage in the localization of brain anatomy and in precisely reclassifying the WMHI, preiventricular ring, and basal ganglia lesions.

REFERENCES

The following citations are incorporated by reference.

A. M. Bensaid, L. O. Hall, J. C. Bezdek, and L. P. Clarke, Validity-guided (re)clustering for image segmentation, IEEE Trans Fuzzy Systems 4 (1996), 112–123.

M. Berstein, Improved detectability in low signal-to-noise ration magnetic resonance images by means of a phase-corrected real reconstruction, Med Phys 16 (1989), 813–817.

J. C. Bezdek, L. O. Hall, and L. P. Clarke, Review of MR image segmentation techniques using pattern recognition, Med Phys 20 (1993), 1033–1048.

K. B. Boone, B. L. Miller, I. M. Lesser, et al., Neuropsychological correlates of white-matter lesions in health elderly subjects. A threshold effect, Arch Neurol 49 (1992), 549–554.

K. Castleman, Digital image processing, Prentice-Hall, Upper Saddle River, 1996, p. 492.

M. C. Clark, L. O. Hall, D. B. Goidgof, R. P. Velthuizen, and M. S. Silbiger, Automatic tumor segmentation using knowledge-based techniques, IEEE Trans Med Imaging (in press).

L. P. Clarke, R. P. Velthuizen, M. A. Camacho, J. J. Heine, M. Vaidyanathan, L. O. Hall, R. W. Thatcher, and M. L. Silbiger, Review of MRI segmentation: Methods and applications, Magn Reson Imaging 13 (1995), 343–368.

J. A. Cohen, Coefficient of agreement for nominal scales, Educ Psychol Measurement 20 (1960), 37–46.

C. Decarli, M. Murphy, M. Tranh, et al., The effect of white matter hyperintensity volume on brain structure, cognitive performance, and cerebral metabolism of glucose in 51 healthy adults, Neurology 45 (1995), 2077–2084.

P. A. Devijver and J. Kittler, Patter recognition: A statistical approach, Prentice-Hall, London, 1982.

M. Filippi, M. Horsfield, P. Tofts, et al., Review article: Quantitative assessment of MRI lesion load in monitoring the evolution of multiple sclerosis, Brain 118 (1995), 160–1612.

H. Gudbjartsson and S. Platz, The Rician distribution of noisy MRI data, MRM 34 (1995), 910–914.

Haralick, Stemberg, Zhuang, et al. Image analysis using mathematical morphology, IEEE PAMI 9 (1987), 532–550.

M. Henkelman, Measurement of signal intensities in the presence of noise in MR images, Med Phys 12 (1985), 232–233.

K. Herholdz, W. Heindel, A. Rackl, et al., Regional cerebral blood flow in patients with leuko-araisis and artherosclerotic carotid artery disease, Arch Neurol 47 (1990), 392–396.

B. Jahne, Digital image processing, concepts, algorithms and scientific applications, Springer-Verlag, Berlin, 1995, p. 213.

M. Karber, R. Shingal, D. L. Collins, G. S. Francis, and A. C. Evans, Model-based 3-D segmentation of multiple sclerosis lesions in magnetic resonance brain images, IEEE Trans Med Imaging 14 (1996), 443–452.

A. Kertesz, S. E. Black, G. Tokar, et al. Periventricular and subcortical hyperintensities on magnetic resonance imaging. "Rims, caps and unidentified bright objects," Arch Neurol 45 (1998), 404–408.

H. Kitagaki, E. Mori, N. Hirono, et al., Alteration of white matter MR signal intensity in frontotemporal dementia, AJNR 18 (1997), 367–378.

J. R. Landisand and C. G. Koch, The measurement of observer agreement for categorical data, Biometrics 33 (1977), 159–174.

D. Leifer, F. S. Buonanno, and E. P. Richardson, Jr. Clinicopathologic correlations of cranial magnetic resonance imaging of periventricular white matter, Neurology 40 (1990), 911–918.

S. MacKay, F. Ezekiel, V. DiSclafani, et al., Alzheimer disease and subcortical ischemic vascular dementia: Evaluation by combining MR imaging segmentation and H-1 MR spectroscopic imaging, Radiology 198 (1996), 537–545.

G. McKhann, D. Drachman, M. Folstein, et al., Clinical diagnosis of Alzheimer's disease: Report of the NINCDS-ADRDA work group under the auspices of the Department of Health and Human Service Task Force on Alzheimer's disease, Neurology 34 (1984), 939–944.

K. Meguro, J. Hatazawa, T. Yamaguchi, et al., Cerebral circulation and oxygen metabolism associated with subclinical periventricular hyperintensity as shown by magnetic resonance imaging, Ann Neurol 28 (1990), 378–383.

C. E. Metz, Seminars in nuclear medicine #8, AAPM 1978, pp. 283–298.

T. R. Mirsen, D. H. Lee, C. J. Wong, et al., Clinical correlates of white-matter changes on magnetic resonance imaging scans of the brain, Arch Neurol 48 (1991), 1015–1021.

D. Parker, et al., Gibbs artifact removal in magnetic resonance imaging, Med Phys 14 (1987), 640–645.

J. Russ, The image processing handbook (2nd ed.), CRC Press, Boca Raton, Flo., 1995.

M. Sonka, S. K. Tadikonda, and S. M. Collins, Knowledge-based interpretation of MR brain images, IEEE Trans Med Imaging 15 (1996), 443–452.

P. Sullivan, R. Pary, F. Telang, et al., Risk factors for white matter changes detected by magnetic resonance imaging in the elderly, Stroke 21 (1990), 1424–1428.

M. Vaidyanathan, L. P. Clarke, L. O. Hall, C. Heidtman, R. Velthuizen, K. Gosche, S. Phuphanich, H. Wagner, H. Greenburg, and M. L. Silbiger, Monitoring brain tumor response to therapy using MRI segmentation, Magn Reson Imaging 15 (1977), 323–334.

R. P. Velthuizen, Validity guided clustering for brain tumor segmentation, Annual meeting of the IEEE Engineering in Medicine and Biology, Society, Montreal, (Proceedings on CD-ROM), 1995.

R. P. Velthuizen, L. P. Clarke, S. Phuphanich, L. O. Hall, A. M. Bensaid, J. A. Arrington, H. M. Greenberg, and M. L. Silbiger, Unsupervised measurement of brain tumor volume on MR images, J Magn Reson Imaging 5 (1995), 594–605. D. A. G. Wicks, et al., Volume measurement of multiple sclerosis lesions with magnetic resonance imaging, Neuroradiology 34 (1992), 475–479.

R. Ylikoski, A. Ylikoski, T. Erkinjuntti, et al., White matter changes in healthy elderly persons correlate with attention and speed of mental processing, Arch Neurol 50 (1993), 818–824.

J. H. Zar, Biostatistical analysis (3rd ed), Prentice-Hall, Upper Saddle River, 1996, pp. 72–75.

11. AUTOMATED QUANTIFICATION OF MRI HYPERINTENSITIES USING HYBRID CLUSTERING AND KNOWLEDGE BASED METHODS

Hyperintense regions in NHU of the brain have been associated with lesions commonly observed in normal aging and in diseases such as Multiple Sclerosis (MS) and Alzheimer's disease (AD). The in vivo MRI lesion load may be correlated with the progression of the disease. Two methods to measure the quantity of NM hyperintense regions have been described: a) visual inspection and categorical assignment; and b) manual computerized methods involving region tracing and thresholding. These methods have yielded conflicting results when applied to AD patients. An unique, automated method for the identification, quantification and visualization of hyperintense regions is disclosed herein. This method, using hybrid clustering and knowledge based techniques, is operator independent and therefore removes the effects of human subjectivity inherit in other quantification methods. The results of this method are compared with the results of the manual computerized methods on 42 AD patients. These preliminary results suggest that the thresholding method underestimates hyperintense quantities, while the method of the present invention closely approximates region tracing in both hyperintense quantity and lesion identification.

11.1. Sensitivity and Specificity in Diagnostic Imaging

With the use of signal detection methods in evaluating diagnostic images, it has become necessary to rate the performance of the various tools in order to judge their possible clinical utility.

In order to develop a measure of the relative accuracy of any given diagnosis tool, it is necessary to measure the sensitivity and the specificity of its performance.

The following commonly accepted definitions are employed herein:

The sensitivity measure describes the fraction of patients with disease that are detected by the diagnostic test in question.

The specificity measure describes the fraction of patients who are correctly identified as having no disease.

11.2. Interrater Reliability Measurement Using the Kappa Statistic

Any study that involves reliance upon humans for measurement of content in images must have some method of quantifying agreement of these observers. The kappa statistic (Cohen, 1960) is one such measure that determines the extent of agreement between two or more judges exceeding that which could be expected to occur purely by chance. The kappa statistic is used when two or more judges consider the same entity and express a judgment regarding that entity.

To assess the relative strength of agreement beyond chance between raters or observers, the following approximation can be applied:

−1.00–0.0=disagreement
0.0–0.20=slight agreement
0.21–0.40=fair agreement
0.41–0.60=moderate agreement
0.61–0.80=substantial agreement
0.81–1.00=almost perfect agreement LOCALIZATION AND QUANTIFICATION OF MRI HYPERINTENSITIES IN ALZHEIMER'S DISEASE: A COMPARATIVE STUDY OF COMPUTERIZED METHODS White matter hyperintense ("WMHI") lesions and the role they play in the expression of Alzheimer's Disease ("AD") has remained unresolved. WMHI, including both deep white matter lesions ("DWML") and periventricular lesions ("PVL"), appear distinctly bright on the magnetic resonance image ("MRI"), and provides the opportunity to study or quantify their existence in vivo. Studies that have recently investigated in vivo lesion load in normal elderly individuals and AD patients have yielded conflicting results regarding their location and quantity.

Computerized methods to quantify WMHI have employed region of interest ("ROI") and/or threshold determination procedures. The discrepancies reported by employing these methods are due to nonspecific computerized lesion identification, and the inherent subjectivity of operator dependency.

Described in a previous study, Knowledge Guided Hyperintensity Detection ("KGHID") is an automated method, based on expert knowledge, that results in the identification, quantification and visualization of brain WMHI. The present study compares ROI and threshold methods with KGHID to quantify WMHI lesion load on MRI (e.g., 90 images) of 10 patients diagnosed with probable AD.

Magnetic resonance imaging is a noninvasive technique offering high resolution analysis of fundamental brain anatomy and/or pathology. Specific disease conditions are increasingly associated with volume changes in specific brain structures, and/or the presence of focal bright spots on MRI images (i.e., hyperintensities). This application introduces an objective, automatic and rapid computer algorithm for post-acquisition analysis of brain MRI studies; the Knowledge-Guided MRI Analysis Program. This computer algorithm automatically recognizes brain regions, computes volumes and identifies hyperintensities for each region. In a pilot series of MRI studies from Alzheimer's disease and Non-AD demented patients, the output from the algorithm discriminated the two diagnostic categories with sensitivity and specificity averaging 80%. It is a feature of the instant invention to include all of the brain from apex to foramen magnum, and fine tune the detection of presently identified and additional brain regions (e.g., cerebellum, brain stem). It is another feature of the instant invention to provide analysis of MRI studies, with an emphasis on dementias, and identify associations between regional volumes and/or hyperintensity burdens with specific diagnostic categories. From these associations, discriminant function equations are optionally developed to aid in differential diagnosis. The program optionally provides a rapid initial screen of all brain MRI studies to highlight regions that are outside of the age- and/or gender-adjusted normal range of values, thereby, suggesting areas to be scrutinized first by the neuroradiologist.

A goal of the instant invention includes developing KGMAP into a general analysis program for conventional MRI studies. Optionally, the output routinely provides volumetric data for a number of brain regions and indicate the locations of hyperintensities. This output is optionally provided with normative data much like routine blood chemistry results are presently displayed.

12. OVERVIEW

12.1. Specific Aims

A computer program is disclosed herein which identifies and regionally localizes hyperintensities (HYPs) and measures the volumes of multiple brain regions on human brain magnetic resonance imaging studies. This program identifies brain regions and detects HYPs without global thresholding, archival maps or user interaction. It is knowledge-guided, building on encoded neuroanatomical relationships and MRI characteristics to classify MRI pixels into specific brain regions. It also integrates MRI information from proton density, T2 and T1 scan sequences in formulating a final analysis. The Knowledge Guided MRI Analysis Program ("KGMAP") is compiled in IDL and can be run on both DOS and UNIX platforms and presently runs in about 3 minutes for a typical MRI study. The fact that it is automatic, permits it to be broadly applied in clinical evaluation of MRIs. The long term goal is to develop this algorithm to serve as an adjunct in the analysis of MRI studies by clinicians. Ultimately, NIR plans to establish age and gender adjusted norms for brain region volume and HYP data for comparison with neural disorders. In conjunction with discriminant function information, such as that proposed here for measuring neural changes consistent with AD dements as distinct from from Non-AD dements, the output from the KGMAP algorithm optionally aids the physician(s) in assigning diagnostic categories.

Pilot data are presented indicating that the KGMAP is equal to or better than other automated or semi-automated methods of identifying HYPs in MRI studies. Data are also presented summarizing the brain region volume data from 50 cases. Further analysis of these cases demonstrates the algorithm is successful in discriminating AD dements from Non-AD dements based on hippocampal atrophy and HYP information.

An optional feature of the instant invention includes application thereof beyond the axial planes (13) to include the entire brain. Such a modified program optionally adds volumetric measurement of the hypothalamus, brain stem and cerebellum, as well as extend the analysis of total brain, gray mater, white matter and CSF spaces.

Another optional feature of the instant invention is to identify disorders for which diagnosis can be facilitated with the application of the algorithm. Examples include additional AD and Non-AD dementia cases. Optionally the KGMAP includes sensitivity and specificity values of 80% or greater in distinguishing these two groups. Optionally, a series of other brain MRI studies is obtained from local MRI centers and analyzed for regional HYP density and volume changes using the KGMAP algorithm. Association between regional and HYP volumes, post-scan diagnosis and patient history is optionally evaluated by means comparisons followed by logistic regression (as for the pilot data).

Another optional feature of the instant invention includes collection of MRI studies for neurologically normal individuals and quantify volumes and HYPs. Optionally, this population is diverse so that gender, age and ethnicity differences in region and HYP volumes can be estimated. From these data, a series of normative values are optionally established. This optionally permits KGMAP to provide output for each MRI analyzed indicating the normal range of values (e.g., adjusted for age, gender, etc., as necessary), and highlighting those values that lie outside the normal range. Finally, the predictor algorithms are optionally applied to indicate those cases with values consistent with specific disease categories.

13. BACKGROUND

13.1. Identification of Changes Consistent with the AD Diagnosis Using MRI Volume Measurements.

Discriminating Alzheimer-type dementias from the host of conditions that can contribute to cognitive dysfunction in older folks remains an evolving science. Certainly, the more information available to the clinician, especially quantitative information, the higher the probability of a correct diagnosis. Work over the last decade has found that careful measurement of hippocampal volume indicates that smaller volumes are associated with Alzheimer's disease and, to a lesser extent, normal aging (Kesslak et al, 1991; Jack et al, 1992; Killiany et al, 1993; deLeon et al, 1997; Mu et al, 1999). Careful analysis of temporal lobe volumes finds good specificity in discriminating between normal elderly, mild cognitive impairment and AD (Convit et al, 1997) or between cases of AD versus dementia with Lewy bodies (Harvey et al, 1999). A recent study confirms the solid correlation between hippocampal volumes obtained by MRI and those obtained by post-mortem histopathology (Bobinski et al, 2000). All of this work is performed with region-of-interest, user-defined analysis of hippocampal volume or rating scales of hippocampal atrophy.

Unfortunately, hippocampal volume is also reported to decline in other clinical conditions. These include epilepsy (Webb et al, 1999) schizophrenia (Wright et al, 2000) and alcoholism (Agartz et al, 1999) or traumatic brain injury (Bigler et al, 1997). Similar arguments can be made regarding the size of the lateral ventricles, and other CSF spaces used as indices of brain atrophy. Still, measurement of regional volumes of temporal lobe structures does have significant diagnostic utility, classifying normals from cognitively impaired individuals correctly 75% of the time (Convit et al, 1997). Thus, while hippocampal volumes may have good sensitivity in detecting dementias, by itself, specificity is optionally restricted given the other clinical conditions where reduced hippocampal volume is reported.

Measurement of brain volumes may also have value in the diagnosis of other neurological and psychiatric disorders. Certainly, the progression of multiple sclerosis (vide infra) benefits from volumetric studies of lesions, and may benefit further from the analysis of T1 weighted images revealing hypointense "black holes" (Truyen et al, 1996; Adams et al, 1999; Dastidar et al, 1999). Changes in regional brain volumes via MRI analysis have also been reported in obsessive-compulsive disorder (Szeszko et al, 1999), bipolar disorder (Strakowski et al, 1999) and psychotics using neuroleptic medications (Gur et al, 1998).

In summary, the literature is reasonably consistent regarding reductions of hippocampal volume in AD, although such changes may not be specific for the disorder. Moreover, measurements of regional volumes might also benefit the diagnosis of other disease states. However, simple measurements of volumes alone may not have much specificity, owing to multiple conditions in which the same volumetric changes are found. For that reason, including estimates of regional hyperintensities might further improve the diagnostic utility of the MRI analysis.

13.2. MRI Hyperintensities in Aging and Disease.

Bright regions on magnetic resonance images of the brain, known as HYPs or unidentified bright objects have been associated with neurodegenerative disease (Kertesz et al 1988; Herholdz et al, 1990; Meguro et al, 1990; Leifer et al, 1990; Filippi et al, 1995) and to a lesser extent with normal age-associated cognitive decline (Boone et al, 1992; Ylikoski et al, 1993; Mirsen et al, 1991; Smith et al, 2000). These lesions are found on autopsy to represent dilated perivascular space, areas of tissue loss/demyelination or lacunar infarcts (Awad et al, 1986; Fazekas et al, 1991; 1993; Braffman et al, 1991). In white matter, these HYPs can collectively contribute to a thinning of this tissue referred to as leukoaraiosis (Hachinski et al, 1987)

While there is currently no cause and effect relation between HYPs and dementia, the presence of lesions can indicate a detectable diminution of cognitive abilities (Baum et al, 1996). Studies attempting to link the occurrence of HYPs to neuropsychological changes indicate that these HYPs may be associated with a decline of cognitive performance especially with respect to performance on timed attentional and visuopractical tasks (Rao et al, 1996). Several studies have indicated HYPs may be helpful in differentiating degenerative dementias (such as Alzheimer's) from dementias with primarily vascular causes (multi-infarct dementia, Binswanger's disease; Barclay et al, 1992; Rao et al, 1996; Libon et al, 1998). In addition, these punctate HYPs have been associated with depression (Coffey et al, 1992; Soares et al, 1997) hypertension (Baum et al, 1996), neurofibromatosis (Moore et al, 1996), and/or brain atrophy (Schmidt et al, 1993).

Regarding the effects of normal aging, it has been argued by some that age per se causes an increase in HYPs on MRI scans (Baum et al, 1996; Fazekas et al, 1996). However, in a detailed analysis covering the adult human lifespan, Jernigan et al, (1991) found increases in HYPs only in their oldest subjects. The high risk of dementia at these ages suggests these could be preclinical lesions. Importantly, a recent study of usual aging spanning the ages of 18 to 81 found a stable low level of HYPs in individuals carefully evaluated for the absence neuropsychological or cognitive disorders, despite identifying graded, age-associated increases in ventricular volume and corresponding declines in white matter (Guttman et al, 1998).

Perhaps the best analysis of potential HYP association with cognitive function is found in the research conducted in multiple sclerosis (MS). HYP involvement in MS typically consists of rather large diffuse white matter lesions as opposed to the small punctate lesions remarked upon by dementia researchers. A review of neuroimaging results (Heaton et al, 1985) suggests that although all confirmed MS patients exhibit cerebral white matter lesions at autopsy, and roughly 95% of living patients exhibit HYPs on T2 weighted MRI scans, only 40–60% of these patients display measurable cognitive faults, covering a rather broad array of cognitive symptoms. These data suggest that there is a threshold of lesion density that a patient must exhibit in order to experience significant cognitive impairment. Research indicates that a patient exhibiting a lesion burden of 30 $cm^2$ will have a much higher probability of cognitive impairment (80%) than patients with smaller total lesion areas (20%)(Rao et al, 1989). Importantly, the region and specific histopathologic characteristics of the lesions may be more important than lesion burden (Moore et al, 1996).

Most previous studies have used one of the following methods to identify HYPs; 1) visual inspection and categorical assignment of the observed results, (Fazekas et al, 1987; Leys et al, 1990; Kertesz et al, 1990; Mirsen et al, 1991; Davis et al, 1992; Kumar et al, 1992; Sheltens et al, 1992; Erkinjuntti et al, 1994; Lopez et al, 1995; O'Brien et al, 1996; Ott et al, 1997) or 2) computerized methods involving region of interest (ROI) tracing (Kitigaki et al, 1997) and/or global threshold determination (Decarli et al, 1995; MacKay et al, 1996; Guttman et al, 1998). Visual interpretation and categorical assignment can provide insight to lesion load within distinct anatomical regions of the brain, but lacks objectivity or the ratio scale measurement required by parametric statistics. CERAD investigators reported that visual interpretation and categorical assignment of white matter lesions is highly subjective (Davis et al, 1992). In spite of efforts to standardize MRI imaging of CERAD subjects and the utilization of a uniform rating scale, the frequency, locations and severity of white matter lesions resulted in an unsatisfactory intraclass correlation.

Recent advances in computerized MIRI segmentation techniques have significantly improved the separation of different tissue types in the MRI data (Bezdek et al, 1993; Clarke et al, 1995; Bensaid et al, 1996; Vaidyanathan et al, 1997; Clarke et al, 1998). Bensaid et al (1996) introduced a variation on fuzzy c-means called Validity Guided Clustering, which is suitable for the discovery of small clusters. Knowledge in the form of an atlas (Karber et al, 1996), region adjacency graphs (Sonka et al, 1996), and rules in an expert system (Clarke et al, 1998) has successfully been used for computerized MRI segmentation for a variety of diseases. Advancements in knowledge-guided algorithms can contribute not only to increased scientific knowledge of disease etiologies, but may also aid the clinician in narrowing the range of differential diagnoses or in early detection of lesions before the patient is symptomatic.

Computerized methods to quantify brain HYPs, incorporating various versions of ROI tracing and/or pixel intensity threshold techniques, result in less subjective quantitative measurements than categorical rating scales. The tracing ROI technique can provide information as to the lesion load within a distinct brain region but introduces operator subjectivity in lesion identification and border detection. The threshold procedure, in which HYPs are defined as all pixels above a given intensity threshold, provides measurement consistency. Yet, in many cases, this approach requires adjustments by the operator for different images and ignores the inherent differences in pixel intensities in each brain region. For example, HYP lesions described as 'punctate' often consist of pixel intensities that lie within a very close range, whereas 'diffuse' regions often host a considerable variety of pixel intensities. Even the landmark study of Guttman et al (1998) using a sophisticated thresholding approach to specify tissue types remarked that it is conceivable some HYPs are misclassified as gray matter in their protocol.

In summary, the many studies that have examined the association of HYPs with dementia or other neural disorders have yielded conflicting results. While the discrepancies may be due in part to the use of different MRI techniques, problems with inter-observer and intra-observer reliability among rating scales, nonspecific computerized lesion identification, and the inherent subjectivity of techniques relying upon operator decision-making, contribute to the lack of consensus.

Using the instant KGMAP algorithm to detect HYPs optionally aids in resolving the confusion regarding the possible associations between HYP abnormalities and specific disease states. KGMAP is automatic; no "blind observers" are required. KGMAP, for example, uses a local thresholding operation comparing HYPs, to the pixel intensity of the structure in which it resides. KGMAP is quantitative avoiding the subjectivity of rating scales. Moreover, KGMAP provides regional information regarding the HYPs, which for some disorders may be more important than the total HYP burden (Moore et al, 1996). The KGMAP program optionally significantly aids in establishing a reliable method for identification and quantification of these MRI abnormalities. Optionally, the instant invention is applied to brain MRIs obtained from local centers to begin ascertaining specific diagnostic capabilities of the technique. Already, my pilot data indicates possible utility in discriminating AD from Non-AD dements. Once this preliminary approach has determined those disorders for which HYP measurement and localization appear most beneficial in aiding diagnosis, application of the instant invention optionally includes autopsy (where feasible) to confirm the clinical diagnosis pathologically.

13.3. Pilot Data

One concern with the initial application is whether the algorithm could be generally applied to multiple MRI studies, not just the one shown in the pilot data section. Table 4 indicates the sensitivity, specificity and kappa scores of the KGMAP analysis of HYPs compared to two computerized methods commonly used to quantify HYPs on brain MRI images; 1) pixel thresholding and 2) region of interest ("ROI") manual tracing.

1. Pixel Thresholding: The quantification of HYPs by a pixel thresholding method (described by DeCarli, 1995) is duplicated with the exception that CSF is segmented using the automated routine of the present invention instead of using an independent thresholding procedure.

2. ROI Manual Tracing: HYP lesions are identified by a manual tracing method performed by two radiology residents.

3. Ground Truth. Resultant lesions, identified by each of the four independent sources (2 ROI, 1 thresholding and KGMAP) are judged as real or false by a neuroradiologist (Reed Murtagh, MD, NIR consultant). A ground truth image is constructed with all real lesions, including some not identified by any of the computerized methods. In addition, lesions identified by one or more computer-based methods are further evaluated for size and border detection accuracy.

The results of each method are analyzed against ground truth to determine the quantity of pixels identified as true positive (e.g., pixels identified as lesions that concur with ground truth) false positive (e.g., pixels identified as lesions that did not concur with ground truth lesion) and false negative (e.g., pixels not identified as lesion but are identified as lesion on the ground truth image). The sensitivity, specificity and Kappa rates are calculated for each method. The values reported in Table 1 reflect the average values from 10 MRI studies (e.g., 9 images per subject) analyzed by each method.

TABLE 4

Comparison of KGMAP with other Computer-Based HYP Detection Methods

| METHOD | SENSITIVITY (range) | SPECIFICITY (range) | KAPPA (range) |
| --- | --- | --- | --- |
| KGMAP | 83% (77–89) | 81% (72–92) | 0.72 (0.65–0.84) |
| Thresholding | 38% (28–45) | 73% (62–90) | 0.09 (0.05–0.14) |
| ROI #1 | 42% (30–49) | 71% (60–86) | 0.15 (0.10–0.22) |
| ROI #2 | 56% (38–75) | 74% (63–84) | 0.12 (0.08–0.15) |

The results in Table 4 indicate that the KGMAP is very accurate at detecting HYPs with both good sensitivity and good specificity. The overall kappa score also validates use of this program to identify HYPs. The results of global pixel thresholding have good specificity (e.g., few false positives), but are poor at detecting HYPs that are on darker backgrounds (e.g., highlighting the advantages of local thresholding), reflected as low sensitivity scores. The two neuroradiology residents performing the ROI tracing tended to be better in terms of sensitivity than the global thresholding approach, but still are not as accurate as the KGMAP. The kappa values for thresholding and ROI methods did not inspire confidence as an adjunct for detailed analysis of MRI images by a neuroradiologist The high degree of concordance between the KGMAP and ground truth indicate this software is a rapid, automated and quantitative method for accurately identifying HYPs in MRI images.

A second concern raised in the review of the original application regarded the "clinical assumption" that HYPs could be useful for differential diagnosis. Arguably, prior studies done without the KGMAP might not be sufficiently sensitive, quantitative or regionally specific enough to detect associations with diagnostic categories. The data available did not strongly support use of HYPs alone in differential diagnosis as shown above, for example in the MRI Hyperintensities in Aging and Disease section. However, for at least one category, dementia of the Alzheimer type, low hippocampal volume is quantitative measure obtained from MRIs that showed association with the disease, for example as discussed in the MRI volume measurements section above. Thus, to improve the program's ability to aid in differential diagnosis, the program is optionally modified to include volumes of the structures studied, and extend the software to conservatively identify hippocampal tissue. It is also possible to compute volumes for CSF, white matter and grey matter by combining the data from all image planes analyzed. Optionally, application of the instant invention includes all, or substantially all, axial planes containing the cranial vault so that volumes for the entire brain can be measured. However, the structures listed below in Table 5 can already be identified and quantified volumetrically by KGMAP.

TABLE 5

Regional Brain Volume Estimates from a Series of 50 MRI Scans S.D is the sample standard deviation. C.V. is the coefficient of variation; (S.D./mean)*100
Volumes are presented as $cm^3$.

| REGION | LEFT SIDE (or TOTAL if not Bilateral) | | | RIGHT SIDE | | |
|---|---|---|---|---|---|---|
| | Mean | S.D. | C.V. | Mean | S.D. | C.V. |
| Intracranial Volume* | 770 | 31 | 4% | | | |
| Total Brain* | 572 | 30 | 5% | | | |
| White Matter* | 311 | 10 | 3% | | | |
| Gray Matter* | 152 | 11 | 7% | | | |
| Ventricular CSF* | 22.4 | 2.3 | 10% | 22.7 | 2.5 | 11% |
| Sulcal CSF* | 21.2 | 2.2 | 10% | 20.8 | 1.9 | 9% |
| Caudate Nucleus | 4.5 | .3 | 7% | 4.5 | .4 | 9% |
| Putamen | 2.5 | 0.2 | 9% | 2.4 | 0.2 | 6% |
| Globus Pallidus | 0.07 | 0.02 | 32% | 0.06 | 0.02 | 31% |
| Thalamus | 4.5 | 0.4 | 8% | 4.4 | 0.4 | 10% |
| Hippocampus | 1.5 | 0.09 | 7% | 1.5 | 0.09 | 7% |

*It should be noted that these volumes are obtained from the 15 axial planes studied and do not include all brain structures, particularly those ventral to the hippocampus.

All scans are obtained from the University Diagnostic Institute. All are undergoing routine MRI for symptoms of dementia. The coefficients of variation of 5 to 10% reflect the normal variance found in human brains. Other standard coefficients of variation are also acceptable. These data indicate the volume estimates obtained from the present KGMAP are not unduly influenced by variations in MRI scans obtained using routine MRI sequences. The volumetric determinations are optionally compared to ground truth.

From the above series of 50 MRI cases, 38 had definite clinical diagnoses of the cause of dementia from the Memory Disorders Clinic at the University of South Florida (NINCDS-ADRDA criteria). Twenty-eight of these are classified as Alzheimer-type dementia (AD) and 10 are classified as dementia of other causes (Non-AD). It should be noted these Non-AD cases are not the same as cognitively normal age-matched individuals typically contrasted with dementia cases in published reports comparing MRI results in AD and age-matched control cases. This combination of cases is similar to that confronting physicians attempting to make the final diagnosis regarding the cause of the cognitive dysfunction leading to patient presentation.

To examine the validity of the KGMAP algorithm, group differences among AD patients and the Non-AD dementia group are examined across the regional and HYP volumes that are obtained. The two groups are comparable in age (AD, 79.1 years vs. Non-AD, 78.1 years; $F (1, 37)=0.15$, $p>0.05$). The brain region and HYP volumes are shown in Table 6.

TABLE 6

Volumetric and Hyperintensity Data for AD and NON-AD Patients (Means + SEM). Values are presented in $mm^3$ rather than $cm^3$ to present the HYP data as whole numbers.

| Measure | Alzheimer's disease n = 28 | Other Dementia n = 10 |
|---|---|---|
| Putamen hyperintensity-left | 120.9 + 7.9 | 63.9 + 13.6*** |
| Putamen hyperintensity-right | 156.2 + 8.8 | 51.9 + 15.1*** |
| Caudate hyperintensity-left | 28.2 + 7.9 | 35.8 + 13.7 |
| Caudate hyperintensity-right | 47.8 + 7.8 | 19.2 + 13.5 |
| Thalamus hyperintensity-left | 146.6 + 30.8 | 224.5 + 52.8 |
| Thalamus hyperintensity-right | 124.4 + 9.8 | 86.1 + 16.9 |
| Periventricular ring HYP-left | 872.7 + 77.9 | 563.7 + 133. |
| Periventricular ring HYP-right | 821.5 + 70.5 | 616.9 + 121. |
| White matter hyperintensities-left | 1251. + 169.6 | 603.0 + 291. |
| White matter hyperintensities-right | 1218. + 177.6 | 654.8 + 305. |
| White matter volume-total | 310711. + 1738. | 314046. + 2987. |
| Ventricular volume-left | 22807. + 495. | 24293. + 850. |
| Ventricular volume-right | 22378. + 458. | 23957. + 787. |
| Sulcal volume-left | 21504. + 469. | 20531. + 805. |
| Sulcal volume-right | 21232. + 399. | 20253. + 686. |
| Hippocampal volume-left | 1199. + 13. | 1335. + 23.9*** |
| Hippocampal volume-right | 1199. + 10. | 1334. + 17.2*** |
| Caudate volume-left | 4566. + 50. | 4560. + 87.1 |
| Caudate volume-right | 4503. + 65. | 4554. + 111.7 |
| Globus Pallidus volume-left | 67.4 + 4.4 | 65.8 + 7.6 |
| Globus Pallidus volume-right | 65.8 + 3.9 | 58.0 + 6.6 |
| Putamen volume-left | 2517. + 42. | 2473. + 72. |
| Putamen volume-right | 2422. + 23. | 2400. + 39. |
| Thalamus volume-left | 4504. + 64. | 4488. + 111. |
| Thalamus volume-right | 4282. + 76. | 4420. + 131. |

***$p < .001$, AD versus Non-AD

A MANOVA is computed on the outcomes with diagnostic category as the between subjects factor and total brain volume, with CSF, as a covariate, or separately with age as a covariate. However, because the results with or without the brain volume or patient age corrections are the same, the uncorrected values are shown in the table. The MANOVA reveals a significant overall effect of diagnostic status (Wilks$_{13}$=0.08, $F (26,10)=4.62$, $p<0.01$). At the univariate level, the volumes for the left and right hippocampal formations are significantly different (F (1, 37)=23.09, p<0.001; $^2$=0.40; F (1, 37)=43.93, p<0.001; $^2$=0.56, respectively). In both cases, the volumes for the AD group are lower than the Non-AD group. In addition, the analyses reveals that group differences in putamen hyperintensities for the left and right side exist (F (1, 37)=12.41, p<0.001; $^2$=0.26; F (1, 37)=34.28, p<0.001; $^2$=50, respectively). The putamen HYP volumes are greater in the AD cases. Although not significant statistically at the P<0.001 level, the mean values for periventricular ring HYP volume (left P<0.05; right P<0.1) and white matter HYP volume (left and right P<0.1) suggest these measures may also prove useful for discriminant analysis as more subjects are added to the study.

In order to quantify the differences between the two groups of demented individuals, separate logistic regression analyses are conducted and sensitivity, specificity, positive predictive value, and negative predictive values are calculated. The results of this analysis are shown in Table 7. As seen in the table, the ability to identify individuals who have AD (sensitivity) is quite good across all of the brain measures. The specificity estimates, the ability to identify Non-AD demented patients correctly, is slightly lower in all cases except for right putamen HYPs. Indeed, the results indicate that measurements from this region enable perfect discrimination of AD patients and Non-AD dements in this sample. However, I note that because of the relatively small sample size examined, the estimates are preliminary may be subject to change as larger numbers of patients are examined. Nevertheless, the data suggests the algorithm provides accurate discrimination between AD patients and non-AD demented elderly individuals.

TABLE 7

Predictive Value Estimates for the Significant Predictors

| Measurement | Sensitivity | Specificity | Positive Predictive Value | Negative Predictive value |
|---|---|---|---|---|
| HIPPOCAMPUS VOL. LEFT | 86.7% | 75.0% | 92.9 | 60.0 |
| HIPPOCAMPUS VOL RIGHT | 81.8% | 80.0% | 96.4 | 40.0 |
| PUTAMEN HYP VOL LEFT | 86.7% | 75.0% | 92.9 | 60.0 |
| PUTAMEN HYP VOL RIGHT | 100% | 100% | 100.0 | 100.0 |

In conclusion, these preliminary data address several of the concerns expressed in the review of the initial application. First, the algorithm can be successfully applied to a series of standard MRI scans. Moreover, the HYP detection capability is equal to or superior to other computer-based methods for measuring HYP volumes, particularly regarding sensitivity. In a series of MRIs from cases of dementia, the algorithm in its present form can discriminate between AD and Non-AD cases based upon Volume and HYP information. Importantly, these data are sufficiently robust that the effects remained when corrected for age or brain volume in covariate analyses. The association of apolipoprotein E genotype with the volume measures is also examined. There is no association of apolipoprotein E allele frequency on any of the parameters measured. This information provides the basis with which to predict that ultimately the algorithm can provide sensitivities and specificities of 80% or greater in categorizing dementia into AD and Non-AD groups, especially when all discriminating variables are combined into a discriminant function equation. As case numbers increase, the KGMAP optionally aids in identifying other discrete dementia categories such as Lewy-body dementias, Pick's disease or AIDS dementias. In addition, optionally disease categories other than dementias for MRI volume features which discriminate them from other related disorders, and/or normal cases of the same age and gender are evaluated.

Thus, the present algorithm, KGMAP, recognizes HYPs on brain MRIs and quantifies and localizes them without requiring user interaction or global thresholding. The present program runs unassisted and completes the analysis of a total MRI study in, for example, about 3 minutes.

13.4. Design and Methods
Optional Further Expansion of the KGMAP Algorithm

At present, the KGMAP measures HYP, area within the periventricular ring, the thalamus, the lenticular nuclei (i.e., globus pallidus and/or putamen), the caudate nuclei, and the subcortical white matter. It measures the volumes of all of these structure, plus CSF spaces, gray matter and hippocarnpus. Extension of the algorithm will include determination of volumes in the hypothalamus, cerebellum and brainstem by including all 5 mm axial planes containing brain tissue in the skull. This, for example, involves generating code to identify the added regions in the corresponding MRI images.

Much of the logic written into KGMAP in its current version (nearly 10,000 lines of code) is optionally used to identify and analyze the additional regions. Optionally, KGMAP begins its analysis in the MRI image just superior to the eye orbit in the axial plane. KGMAP uses this image to initially identify the regions that are analyzed first (e.g., caudate and lenticular nuclei, lateral ventricle and corresponding penventricular ring, and/or thalamus). The initial identification of these regions relies on the encoded knowledge of brain anatomy written into the logic of KGMAP. That is, localizing any one region relies on its relative location to another region. For example, the location of the caudate nuclei aids in localizing the lenticular nuclei, in that the lenticular nuclei lie just slightly inferior and lateral to the caudate nuclei when viewed in the axial plane. Once identified on the initial image, KGMAP uses the pixel locations of these identified regions to aid in locating these regions on the subsequent image planes. Currently, this process is repeated in each subsequent slice to the apex of the brain. For this project, KGMAP will be modified to identify regions of interest that exist below the plane just superior to the eye orbit to recognize the remainder of brain tissue through to the brain stem. For example, the location of the caudate nuclei aids in the localization of the hippocampus in that the hippocampus lies inferior to the caudate head as it enters the temporal lobe. In addition to using the caudate nuclei, the hippocampus is optionally localized by its most medial position relative to the white matter of the temporal lobe and its most superior border (for instance, as viewed in the axial plane) delineated by the inferior horn of the lateral ventricle.

The KGMAP algorithm can be performed using films of the MRIs which are scanned into the computer, but is more accurate if the digitized MRI files are used. To facilitate the transfer of these electronic files, each participating MRI center is optionally provided with a CD-writer that can be adapted to the computer retaining the electronic MRI data. For instance, each evening, the MRI technologist can simply identify the files of those patients agreeing to participate in the study, delete any identifying information and, copy the files onto CD. Each MRI file contains roughly 35 MB of information, permitting up to 18 images to be placed on a single CD. At a cost of $2 per CD, this is a minor expense for the study, and considerably less tedious than redigitizing film versions of the individual scans. Electronic capture also facilitates anonymity by permitting identifying information to be removed from the data before it is conveyed to an analysis center, such as NeuroImaging Research Inc.

The KGMAP Algorithm.

MRI Data Acquisition

By way of example, a complete MRI of the brain, including images in the axial, coronal and sagittal planes is acquired on a 1.5 Tesla Signa Advantage scanner (GE Medical Systems, Milwaukee, Wis.). The multispectral MRI dataset for each brain slice consists of proton density weighted (PDw) (TR/TE$_{eff}$ 3000/17 msec), T1 weighted (T1w) (TR/TE$_{eff}$ 550/27 msec) and T2 weighted (T2w) (TR/TE$_{eff}$ 3000/102.2 msec) acquisitions with an acquisition matrix of 256×192, a field of view of 22 cm and a slice thickness of 5 mm. It should be noted that the algorithm does not require these spectra, just that they are the standard for the centers agreeing to participate in this study.

Using the instant invention, images obtained in the axial plane are analyzed, where, for example, the first of nine consecutive slices are identified by the concurrent presence of the lateral ventricle, thalamus, basal ganglia (head of the caudate and lenticular nuclei) and the genu of the corpus callosum. The selected volume, for example, just superior to the eye orbit through to the apex of the brain, allows maximum exposure to white matter while minimizing the effects of extraneous tissue.

Pre-Segmentation Processing

After data acquisition, but before any segmentation or knowledge guided processing occurs, the brain area is automatically identified from the images. This unsupervised masking of the intracranial tissue is empirically developed. It uses a logarithmic transformation of the gray values in the PDw slice to effect a better separation of the dark background pixels from the brighter pixels of the imaged head. Once each pixel in the raw PDw image is replaced by its natural logarithm, the image is thresholded by retaining only those pixels that constitute the top 30% of the intensities in this image, the rest being set to value zero. This step has shown to result in a reliable mask for the whole head. With the background removed, the intensities of the PDw image are now shifted lower in value by effectively dividing the image intensities by a factor of 10 and then replacing each pixel by its natural logarithm. These steps serve to move the darkest pixels in the original PDw image to zero so that the natural boundary between the skull and intracranial tissue can be more easily found with a simple threshold. The image is then thresholded such that the lowest 30% of the resulting intensities are set to zero. A region labeling algorithm is now applied to the result followed by an erosion operation ensuring that any imaged tissue connecting the skull and brain not removed during thresholding will be severed. Once these residual tissue fragments are removed, the final mask is created by applying a dilation operation to the remaining pixels. The resulting dilation is converted to a binary image and applied as a multiplicative mask to the original multispectral image set (PDw,T2w,T1w). This process is repeated for each of the nine consecutive slices acquired for each patient, since the brain area will vary with the slice.

The following optional final step in the unsupervised masking is executed if the previous steps did not result in an adequate brain segmentation. The success or failure is judged by a simple measurement of the masked brain area. Based on the Alzheimer disease cases in my data set, the desired intracranial mask will comprise from about 65% to about 83% of the total image area in a 256×256 pixel image with a 22 cm field of view. Any deviation from this range at the end of the first stage leads to several iterations with small incremental adjustments in threshold values until a mask with area less than about 83% of the whole head for that slice is obtained.

An optional design goal of the masking technique described above includes a completely automatic and unsupervised procedure to provide masked images to, for example, the VGC module.

Validity Guided Clustering

The VGC algorithm (Bensaid et al, 1996) is an enhanced version of fuzzy c-means ("FCM"). FCM is an iterative clustering algorithm that finds a cluster center for each class (Bezdek et al, 1993). The optimization procedure in FCM inherently leads to classes that are approximately of the same size, and the resulting segmentation may not be anatomically meaningful (Velthuizen et al, 1995). Bensaid et al. (1996) developed a refinement of FCM using a validity measure called Validity Guided Clustering ("VGC"). The validity measure is essentially a fuzzy and normalized version of the Wilks's lambda statistic, which is used for example in linear discriminant analysis (Devijver and Kittler, 1982). VGC operates on the output of FCM and iteratively tries to improve the validity of the partitioning by splitting and merging clusters. At each iteration, the modified partition is evaluated and is retained if it constitutes an improvement. This method has been applied successfully to brain tumor images (Velthuizen, 1995), and because of its capability to detect small classes, VGC is a suitable clustering tool for application to MRI hyperintensities.

In an embodiment, thought not every embodiment, of the instant invention, VGC is applied to the masked image sets and four classes are searched: cerebrospinal fluid (CSF) ($1^{st}$ class), white matter (WM) ($2^{nd}$ class), gray matter (GM) ($3^{rd}$ class) and a fourth class tissue type comprised partially of WM HYP. Although VGC differentiates the four classes better than FCM, it is riot effective in producing a reliable segmentation of the hyperintensities. The WM HYP lesions vary in intensity over the image, which can be understood as partial volume effects and some image non-uniformity due to the characteristics of the MRI coil (Wicks et al, 1992).

Both FCM and VGC rely solely on, the pixel intensities in the image, while the radiologist's perception is guided by the anatomical positions of the brightness levels. For this reason, among others, an automated knowledge-guided method is developed that utilizes the initial segmentation of the four different tissue types from VGC to locate various anatomical regions of the brain. With these locations, KGMAP then further refines the third (GM) and fourth tissue classifications to isolate the (suspected) lesion tissue. Integrated into the KGMAP software is knowledge concerning the relative likelihood of lesion tissue occurring in the locations being analyzed, resulting in a more effective identification of possible lesions regardless of their underlying pixel intensity variations or size.

The Knowledge-Guided Algorithm

The initial segmentation obtained by application of VGC to the masked data is refined by KGMAP. The knowledge rules of KGMAP are based on intensities combined with the spatial relationship of anatomical structures.

MRI pixel intensities vary greatly from one patient to the next and can also exhibit significant inter-slice variation within the same patient (Wicks et al, 1992). Since the image data has a high signal to noise ratio, the distributions of intensities for each cluster approximate Gaussians (Henkelman, 1985; Parker et al, 1987; Bernstein et al, 1989;

Gudbjartsson and Platz, 1995). Z-scores (Zar 1996) are then a meaningful measure of the intensity distributions:

$$Z_c(I_k) = (I_k - \mu_{ck})/\mu_{ck} \quad k=T1w, PDw, T2w; \quad 1 \leq c \leq 4$$

where $I_k$ is the pixel intensity in the $k^{th}$ spectral image, $_{ck}$ and $_{ck}$ are the mean and standard deviations of the pixels classified in the "c" class respectively. The $Z_4(I_{PDw})$, $Z_4(I_{T2w})$, and $Z_2(I_{T1w})$ scores are optionally used in specific rules described below.

KGMAP analyses begin with the identification of the lateral ventricles, caudate nuclei, lenticular nuclei, and the thalamus in the first image of each patient case. The locations of these structures, once identified, are used to identify their possible presence in subsequent slices. Details of these localization procedures are discussed below.

Lateral Ventricles: Localization of the lateral ventricles begins by applying an iterative region growing operation to an initial seed of 1 pixel positioned at the midpoint of the intracranial tissue, calculated as the point in the image that represents the average x and y coordinates of the tissue. With each growth iteration, horizontal lines are generated, initially 50 pixels in length and stacked in single pixel layer increments in the ±y direction. With the generation of each new line, the length is adjusted in the ±x direction, limited by the most lateral occurrences of CSF that lie medial to the white matter comprising the internal capsules. The extension in the ±y direction continues until white matter pixels are detected (the genu and splenium of the corpus callosum). This region growing process creates a mask that roughly resembles the shape of the lateral ventricles.

CSF pixels identified by the VGC segmentation are grouped into regions by a region labeling operation (also known as "blobbing"; Russ, 1995). The ventricular CSF comprising the lateral ventricles is identified and isolated as those regions that have a non-empty intersection of these regions with the mask just generated.

The lateral ventricle is divided both vertically and horizontally, guided by its anatomical shape. The vertical division is defined as the midpoint between its maximum and minimum location with respect to the x-axis. The horizontal division occurs where its width is minimum. To assist in the localization of the caudate and lenticular nuclei, the upper half of the lateral ventricle is further divided into three distinct regions defined as superior, central, and inferior to the caudate curvatures, as shown, by way of example, in FIG. 3. These curvatures, occurring bilaterally with respect to the vertical division, appear as concave regions in the exterior wall of the lateral ventricle. The superior border of each curvature is defined by the point where the x-coordinates of the pixels comprising the lateral ventricle reach their absolute maximum distances from the vertical dividing line. The inferior border is defined by the presence of the thalamostriate vein immediately adjacent to the wall of the lateral ventricles and by $4^{th}$ class z-scores indicating pixels with bright appearance on the T2w and PDw images. The central region of the caudate curvature is then defined as the area between its superior and inferior borders.

Caudate Nuclei: The caudate nuclei are identified as segmented clusters of GM and $4^{th}$ class tissue located immediately adjacent to and confined within the central region of the caudate curvatures defined above. While the medial edge and body of each nucleus are defined solely by their locations within their respective curvatures, the lateral edges occur where their tissues converge with the white matter comprising the internal capsule. To find this edge, pixels comprising the nuclei are grouped with respect to their y-coordinates. Each subgroup of pixels then represents a horizontal line extending from the medial edge outward. Individual subgroups are analyzed by searching for the occurrence of white matter in the vicinity of a (roughly vertical) line joining the maximum x-coordinates of the superior and inferior borders. To account for any missing expected WM within these subgroups, a spline curve is fit to those subgroups in which WM is found, thus fixing the lateral edge of the,caudate nuclei .

Lenticular Nuclei: (Putamen and Globus Pallidus) The lenticular nuclei are identified using knowledge of their bilateral locations, positioned generally lateral and slightly inferior to the caudate nuclei as viewed in the axial plane These nuclei are clusters composed of GM and $4^{th}$ class tissue that are bordered by WM pixels making up the internal and external capsules. The demarcation of the lenticular nuclei from the surrounding WM is accomplished in a manner that is similar to the method used to depict the lateral edge of the caudate nuclei. Lesions confined within the lenticular nuclei are identified as small clusters of hyperintense tissue with $4^{th}$ class pixel z-scores indicating their bright appearance on the T2w and PDw images Thalamus: Viewed in the axial plane, the thalamus is identified as segmented clusters of GM and $4^{th}$ class tissue bilaterally positioned inferior to the lower edge of the caudate curvatures and immediately adjacent to the lateral ventricle. Clusters of GM and $4^{th}$ class tissue, identified by VGC segmentation are grouped by region labeling. The thalamus is identified as the intersection of these regions with the confined area of interest.

Hippocampus: The hippocampus is initially identified by KGMAP on the image in which temporal horn and body of the lateral ventricle appear to separate in the axial plane. This generally, but not necessarily, occurs within 2 images below the first image of analyzed by KGMAP. As the analyzes of KGMAP works downward from the first image into the temporal lobe of the brain, the tissue comprising the hippocampus is initially identified as that tissue confined within the space separating the temporal horn and body of the lateral ventricle. In the axial plane, its superior border lies inferior to the remaining body of the lateral ventricle, while its lateral and inferior borders lie medial and superior to the temporal horn of the lateral ventricle. As like all other brain regions that KGMAP identifies, the initial identification of the hippocampus is used to aid in its location in subsequent images. The analyzes of the hippocampus continues as KGMAP proceeds though the temporal lobe until the hippocampal tissue is no longer apparent and replaced by a strong indication of white matter.

Periventricular Ring: With the delineation of ventricles and nuclei, KGMAP proceeds to classify lesion tissue in the image beginning with the periventricular ring. These lesions are identified by iteratively applying a morphological dilation operator (Haralick et al, 1987) to the previously defined exterior edge of the lateral ventricle. Each dilation generates a single pixel ring around the previous single layer. During each iteration, all pixels identified as caudate nuclei and thalamus are removed from the single pixel ring and remaining pixels are judged for suitability as lesion tissue via their respective $4^{th}$ class z-scores of the PDw and T2w images. The dilation process continues until all pixels contained within the final single layer are identified as WM by the original VGC segmentation or $4^{th}$ class z-scores indicating their hypointense appearance on the PDw and T2w images.

White Matter: With the accumulation of the brain structure information outlined above, KGMAP identifies white matter hyperintense, lesions ("WM HYP") contained entirely within regions identified as WM. Using the original masked image representing the intracranial region, the effects of CSF confined within the sulci and the GM tissue immediately surrounding these pockets of CSF are removed. The image of the remaining intracranial tissue is subjected to an iterative morphological erosion operation, removing pixels in single layer increments. With each iteration, the WM pixels that are removed by the erosion operator are returned to the eroding image. The erosion process continues until all pixels in the final layer are identified as either white matter by the original VGC segmentation, pixels comprising the border between GM and WM with low $4^{th}$ class z-scores in the PDw and T2w images, or pixels making up the lateral borders of the lenticular nuclei.

From this resultant image, all pixels identified as lateral ventricle, thalamus, caudate nuclei, lenticular nuclei, or the periventricular ring are removed leaving only the WM tissue and possible hyperintense lesions embedded within it. To isolate these lesions, all pixels identifiable as WM are removed. The resultant clusters of pixels, comprised primarily of $4^{th}$ class tissue, are individually analyzed via $4^{th}$ class z-scores derived from the PDw and T2w images to determine their eligibility as WM HYP lesions. Large clusters (e.g., 10 or more pixels) are divided, if required, into separate regions by excluding hypointense embedded pixels with low $4^{th}$ class z-scores indicating WM on the PDw and T2w images. Pixel clusters are removed from further consideration as WM HYP lesion if not surrounded primarily by WM identified either by VGC segmentation or pixels with z-scores indicating WM on the PDw and T2w images. In addition, pixel clusters representing perivascular spaces, with z-scores in the second class that possibly represent the hypointensities of CSF on the T1w image, are also removed.

The remaining regions in the image are subjected to a geometrical shape analysis which judges their circularity by forming the quotient of the cluster area divided by the square of the cluster perimeter (Jahne, 1995; Castleman, 1996). This measure of circularity is insensitive to cluster size, and is a number ranging from 1/(4) for a perfect circle, becoming substantially smaller as the cluster becomes more elongated. Clusters deemed essentially linear in shape are rejected from further analysis. The prevailing clusters are then identified as tissue comprising WM HYP lesions.

Total Intracranial Volume: This is the volume of all pixels remaining after the skull is removed from the image. At present, the value I have, refer only to the volumes derived from the 15 most dorsal 5 mm axial planes.

Total Brain: This is the volume of brain tissue (e.g., white and/or gray matter) after all CSF pixels are subtracted.

Sulcal CSF: This is the volume of pixels identified as CSF after the lateral ventricle CSF pixels are subtracted.

Calculation of Volumes: Volumetric measures are calculated as the total number of pixels comprising a brain region multiplied by the slice thickness and by the squared value of the field of view divided by the image size. For example, the volumetric measure of the putamen in my pilot data is calculated as:

# of pixels identified as putamen$\times(0.240 \text{ cm}/256)^2 \times 0.005$ cm=volume (in cm$^3$)

where: 0.240 is the field of view in cm; 256 is the image size in pixels and 0.005 is the slice thickness in millimeters.

Data Analysis

The data analysis is optionally performed essentially as shown above. Optional changes include the addition of regional volume information, which soon will encompass the entire cranial vault, and the inclusion of several covariates in the analyses such as age, gender, race education and genotype as these data are available with the cases.

An analytic strategy is, for example, completed in two phases. The first phase optionally examines whether there are significant diagnostic group (e.g., AD and Non-AD) differences in terms of the lesion density or regional volumes in the circumscribed brain areas. This is optionally accomplished in two ways. First, a MANOVA comparing regional or HYP volumes in the various brain areas across the diagnostic groups is optionally computed. If the overall group effect is statistically reliable, this is optionally followed up with univariate ANOVAs for the individual brain areas, with appropriate post-hoc comparisons. These analyses allow one to determine whether a specific disorder exhibits a different pattern of lesion density or atrophy, as compared to another set of disorders. For the mean-level analyses, the use of omnibus tests of significance does offer control over inflated Type I error produced by multiple tests of significance (Stevens, 1996). In addition, to ensure that the number of significant findings in each "family" of univariate analyses exceeds chance one can introduce a sequential Bonferroni adjustment to maintain a family-wise alpha level of 0.05 (Ramsey, 1982). Each univariate effect is arranged in descending order based on the F value for each test. The critical alpha level for each test is determined by the formula $1-(1-0.05)^{1/DV}$ where DV equals the number of dependent variables remaining. This procedure is repeated until a nonsignificant effect is found or until all effects are tested.

In another embodiment of the instant invention, descriptive analyses of the MRI images optionally involve discriminant function analysis. In this case, two groups are optionally chosen to compare (e.g., AD and Non-AD) and attempt to develop a discriminant function equation. In this case, it is examined whether a combination of the lesion densities or regional volumes from the various brain sites optionally discriminate between the diagnostic groups. In terms of the variables to be included in the equation, the first step optionally include age, gender, and/or years of education in an attempt to control for the potential confounding effects of these relationships. On the second step, those brain structures shown to exhibit significant group differences in the mean-level analysis is optionally entered in a step-wise fashion. Because the initial discriminant function analyses are primarily descriptive in nature, a relatively liberal criterion of alpha=0.05 will be adopted for these analyses. However, the potential for spurious findings is optionally reduced by my inclusion of the independent sample of participants during the predictive portion of the analyses. After the discriminant function equation has been developed and using the clinical diagnosis as the criterion variable, sensitivity and specificity estimates is optionally calculated in order to provide an estimation of the efficiency of the classification scheme.

HUMAN SUBJECTS

Subjects optionally include a consecutive series of patients receiving MRI studies at local MRI centers. Criteria for inclusion is, for example, age (e.g., over 30), consent to participate, and/or a clear post-MRI study clinical diagnosis. Thus, for example, women and minorities are optionally included. As subjects are optionally medical patients, at least some have some type of illness causing their presentation at the MRI clinic.

LITERATURE CITED

The following citations are incorporated herein by reference.

Adams, H. P. et al (1999) Hypointense and hyperintense lesions on magnetic resonance imaging in secondary-progressive MS patients. *Eur.Neurol.* 42: 52–63.

Agartz, I., Momenan, R., Rawlings, R. R., Kerich, M. J., & Hommer, D. W. (1999) Hippocampal volume in patients with alcohol dependence. *Arch.Gen.Psychiatry* 56: 356–363.

Awad, I. Johnson, P C, Spetzler, R F, Hodak, J. A. (1986) Incidental subcortical lesions identified on magnetic resonance imaging in the elderly. II. Postmortem pathological correlations. *Stroke*. 17: 1090–107.

Barclay, L. L., Linden, C., & Murtagh, R. (992) Medial temporal atrophy as a magnetic resonance imaging marker for Alzheimer's disease. *J Neuroimaging*. 2: 131–135.

Baum et al (1996) Incidental White Matter Foci on MRI in Healthy Subjects. Neuroradiology 38; 755–760

Bensaid A M, Hall L O, Bezdek J C, and Clarke L P. Validity-guided (re)clustering for image segmentation. IEEE Transactions on Fuzzy Systems, 4(2): 112–123, 1996.

Bernstein, M, et al. Improved detectability in low signal-to-noise ratio magnetic resonance images by means of a phase-corrected real reconstruction. Med Phys. 16(5): 813–817, 1989.

Bezdek, J. C. L. O. Hall, and L. P. Clarke. Review of MR image segmentation techniques using pattern recognition. Medical Physics, 20(4): 1033–1048, 1993.

Bigler, E. D. (1997) Hippocampal volume in normal aging and traumatic brain injury. *AJNR.Am.J Neuroradiol*. 18: 11–23.

Bobinski, M., de Leon, M. J., Wegiel, J., et al (2000) The histological validation of post mortem magnetic resonance imaging- determined hippocampal volume in Alzheimer's disease. *Neuroscience* 2000;95(3):721–5.95: 721–725.

Boone K B, Miller B L, Lesser I M, et al. Neuropsychological correlates of white-matter lesions in health elderly subjects. A threshold effect. Arch Neurol 49: 549–554, 1992.

Braffman, B. Zimmerman R J, Trojanowski, J Q et al. (1992) MR imaging of tuberous sclerosis: pathogenesis of this phakomatosis, use of gadopentetate dimeglumine, and literature review. *Radiology*. 183: 227–38. Review.

Castleman, K, Digital Image Processing (Prentice-Hall, Upper Saddle River) 1996. p.492

Clark M C, Hall L O, Goldgof D B, Velthuizen R P and Silbiger M S. Automatic tumor segmentation using knowledge-based techniques. Accepted for publication in IEEE Trans on Medical Imaging, 1998.

Clarke L P, Velthuizen R P, Camacho M A, et al Review of MRI segmentation: methods and applications. Magnetic Resonance Imaging 13(3): 343–368, 1995.

Coffey et al (1992) Quantitative Cerebral Anatomy of the aging Human Brain. Neurology 42; 527–536

Convit, A., McHugh, P., Wolf, O. T., de Leon, M. J., et al. (1999) MRI volume of the amygdala: a reliable method allowing separation from the hippocampal formation. *Psychiatry Res*. 90: 113–123.

Dastidar, P., Heinonen, T., Vahvelainen, T., Elovaara, I., & Eskola, H. (1999) Computerised volumetric analysis of lesions in multiple sclerosis using new semi-automatic segmentation software. *Med.Biol Eng.Comput*. 37: 104–107.

Davis, P. C., Gray, L., Albert, et al, (1992) The Consortium to Establish a Registry for Alzheimer's Disease (CERAD). Part III. Reliability of a standardized MRI evaluation of Alzheimer's disease. *Neurol* 42: 1676–1680.

Decarli, C., Murphy, M., Tranh, M., et al. (1995) The effect of white matter hyperintensity volume on brain structure, cognitive performance, and cerebral metabolism of glucose in 51 healthy adults. Neurology, 45:2077–2084.

P. A. Devijver and J. Kittler, Pattern Recognition: A Statistical Approach. London: Prentice Hall International, 1982.

Erkinjuntti, T., Gao, F., Lee, D. H., Eliasziw, M., Merskey, H., & Hachinski, V. C. (1994) Lack of difference in brain hyperintensities between patients with early Alzheimer's disease and control subjects. *Arch.Neurol*. 51: 260–268.

Fazekas, F., Chawluk, J. B., Alavi, A. et al. (1987) MR signal abnormalities at 1.5T in Alzheimer's disease and normal ageing. American Journal of Roentenology, 149:351–356

Fazekas, F., Alavi, A., Chawluk, J. B., & et al, (1989) Comparison of CT, MR, and PET in Alzheimer's dementia and normal aging. *J.Nucl.Med*. 30: 1607–1615.

Fazekas, F., Kapeller, P., Schmidt, R., Offenbacher, H., Payer, F., & Fazekas, G. (1996) The relation of cerebral magnetic resonance signal hyperintensities to Alzheimer's disease. *J Neurol.Sci*. 142: 121–125.

Filippi, M., Horsfield, M., Tofts, P., et al (1995) Review Article: Quantitative assessment of MRI lesion load in monitoring the evolution of multiple sclerosis. Brain, 118, 1601–1612.

Gosche K. M., Velthuizen R. P., Murtagh F. R., Arrington J. A., Mortimer J. A., Clarke L. P., (1999) Automated Quantification of Brain MRI Hyperintensities Using Hybrid Clustering and Knowledge Based Methods. IJIST, 10(part 2):287–293,.

Gudbjartsson, H, Platz, S. The Rician distribution of noisy MRI data. MRM 34:910–914, 1995.

Guttmann, C., Jolesz, FA , Kikinis R, Kiliany, R J, Moss, M B, Sandor, T., Albert, M S, (1998) White matter changes with normal aging. *Neurology*. 50: 972–98.

Gur, R. E., Maany, V., Mozley, P. D., Swanson, C., Bilker, W., & Gur, R. C. (1998) Subcortical MRI volumes in neuroleptic-naive and treated patients with schizophrenia [see comments]. *Am.J Psychiatry* 155: 1711–1717.

Haralick, Sternberg, Zhuang, et al (1987) Image analysis using mathematical morphology. IEEE PAMI 9(4):532–550.

Harvey, G. T., Hughes, J., McKeith, I. G., et al (1999) Magnetic resonance imaging differences between dementia with Lewy bodies and Alzheimer's disease: a pilot study. *Psychol.Med*. 29: 181–187.

Hachinski et al (1987) Leuko-araiosis. Arch Neurology 44; 21–23

Heaton et al (1985) Neuropsychological Findings in Relapsing Remitting and Chronic-Progressive Multiple Sclerosis. J Consul ting and Clincal Psychology 53; 103–110

Henkelman, M. Measurement of signal intensities in the presence of noise in MR images. Med Phys 12(2): 232–233, 1985.

Herholdz K, Heindel W, Rackl A, et al. Regional cerebral blood flow in patients with leuko-araiosis and artheroscierotic carotid artery disease. Arch Neurol 47:392–396, 1990

Huberty, C. (1994). *Applied discriminant analysis*. New York: Wiley.

Jack, C. R., Jr., Petersen, R. C., O'Brien, P. C., & Tangalos, E. G. (1992) MR-based hippocampal volumetry in the diagnosis of Alzheimer's disease. Neurol 42: 183–188.

Jahne, B., Digital Image Processing,Concepts, Algorithms and Scientific Applications (Springer-Verlag, Berlin) 1995. p. 213

Jernigan, T. L., Salmon, D. P., Butters, N., & H esselink, J. R. (1991) Cerebral structure on MRI, Part II: Specific changes in Alzheimer's and Huntington's diseases. *Biol Psychiatry* 29: 68–81.

Karber M, Shingal R, Collins D L, Francis G S, and Evans A C. Model-based 3-D segmentation of multiple sclerosis lesions in magnetic resonance brain images. IEEE Trans Med Image 14(3):443–452, 1996.

Kertesz, A. et al (1988) Periventricular and subcortical hyperintensities on magnetic resonance imaging. 'Rims, caps, and unidentified bright objects'. *Arch.Neurol.* 45: 404–48.

Kertesz, A., Polk, M., Carr, T. (1990) Cognition and white matter changes on magnetic resonance imaging in dementia. Archives of Neurology, 47:387–391.

Kesslak, J. P., Nagata, S. F., Lott, I., & Nalcioglu, O. (1994) Magnetic resonance imaging analysis of age-related changes in the brains of individuals with Down's syndrome. *Neurol* 44: 1039–1045.

Killiany, R. J., Moss, M. B., Albert, M. S., Sandor, T., Tieman, J., & Jolesz, F. (1993) Temporal lobe regions on magnetic resonance imaging identify patients with early Alzheimer's disease. *Arch.Neurol.* 50: 949–954.

Kitagaki, H., Mori, E., Hirono, N., et al. (1997) Alteration of white matter MR signal intensity in frontotemporal dementia. AJNR, 18:367–378.

Kumar, A., Yousem, D., Souder, E., Miller, D., Gottlieb, G., Gur, R., & Alavi, A. (1992) High-intensity signals in Alzheimer's disease without cerebrovascular risk factors: a magnetic resonance imaging evaluation*Am.J Psychiatry* 149: 248–250.

Leifer, D., Buonanno, F. S., Richardson, E. P. Jr. (1990) Clinicopathologic correlations of cranial magnetic resonance imaging of periventricular white matter. Neurology, 40, 911–918.

Leys, D., Soetaert, G., Petit, H., Fauquette, A., Pruvo, J. P., & Steinling, M. (1990) Periventricular and white matter magnetic resonance imaging hyperintensities do not differ between Alzheimer's disease and normal aging [see comments]. *Arch.Neurol.* 47: 524–527.

Libon, D. J., Bogdanoff, B., Cloud, B. S. et al(1998) Declarative and procedural learning, quantitative measures of the hippocampus, and subcortical white alterations in Alzheimer's disease and ischaemic vascular dementia. *J Clin.Exp.Neuropsychol.* 20: 30–41.

Lopez, O. L., Becker, J. B., Jungreis, C. A. et al. (1995) Computed tomography-but not magnetic resonance imaging- identified perventricular white matter lesions predictsymptomatic cerebrovascular disease in probable Alzheimer's disease. Archives of Neurology, 52:659–664

MacKay, S., Ezekiel, F, DiSclafani, V., et al. (1996) Alzheimer disease and subcortical ischemic vascular dementia: evaluation by combining MR imaging segmentation and H-1 MR spectroscopic imaging. Radiology, 198:537–545.

Mirsen, T. R., Lee, D. H., Wong, C. J., et al. (1991) Clinical correlates of white-matter changes on magnetic resonance imaging scans of the brain. Arch. of Neurology, 48:1015–1021.

Meguro K, Hatazawa J, Yamaguchi T, et al. Cerebral circulation and oxygen metabolism associated with subclinical periventricular hyperintensity as shown by magnetic resonance imaging. Ann Neurol 28:378–1383, 1990.

Moore et al (1996) Neuropsychological Significance of Areas of High Signal Intensity on Brain MRIs of Children with Neurofibromatosis. Neurology 46; 1660–1668

Mu, Q., Xie, J., Wen, Z., Weng, Y., & Shuyun, Z. (1999) A quantitative MR study of the hippocampal formation, the amygdala, and the temporal horn of the lateral ventricle in healthy subjects 40 to 90 years of age. *AJNR.Am.J Neuroradiol.* 20: 207–211.

O'Brien, J., Desmond, P., Ames, D.,et al (1996) A magnetic resonance imaging study of white matter lesions in depression and Alzheimer's disease [see comments] [published erratum appears in Br J Psychiatry 1996 June;168(6):792]. Br.J Psychiatry 168: 477–485.

Ott, B. R., Faberman, R. S., Noto, R. B., et al (1997) A SPECT imaging study of MRI white matter hyperintensity in patients with degenerative dementia. *Dement-.Geriatr.Cogn.Disord.* 8: 348–354.

Parker, D, et al. Gibbs artifact removal in magnetic resonance imaging. Med Phys 14(4):640–645, 1987.

Ramsey, P. H. (1982). Empirical power for procedures for comparing two groups on p variables. *Journal of Educational Statistics*, 7, 139–156.

Rao, S. (1996) White Matter Disease and Dementia. Brain and Cognition 31; 250–268

Russ, J. The Image Processing Handbook, $2^{nd}$ Edition (CRC Press, Boca Raton), 1995

Scheltens, P., Leys, D., Barkhof, F., et al (1992) Atrophy of medial temporal lobes on MRI in "probable" Alzheimer's disease and normal ageing: diagnostic value and neuropsychological correlates. *J Neurol.Neurosurg.Psychiatry* 55: 967–972.

Schmidt, R. (1992) Comparison of magnetic resonance imaging in Alzheimer's disease, vascular dementia and normal aging. *Eur.Neurol.* 32: 164–169.

Snowdon, D. A., Greiner, L. H., Mortimer, J. A., Riley, K. P., Greiner, P. A., & Markesbery, W. R. (1997) Brain infarction and the clinical expression of Alzheimer disease. The Nun Study [see comments]. *JAMA* 277: 813–817.

Snowdon, D. A., Kemper, S. J., Mortimer, J. A., Greiner, L. H., Wekstein, D. R., & Markesbery, W. R. (1996) Linguistic ability in early life and cognitive function and Alzheimer's disease in late life. Findings from the Nun Study [see comments]. *JAMA* 275: 528–532.

Soares et al (1997) The Anatomy of Mood Disorders Biol Psychiatry 41;86–106

Sonka M, Tadikonda S K, and Collins S M. Knowledge-based interpretation of MR brain images. IEEE Trans Med Imag 15(4), 443–452, 1996.

Stevens, J. (1996). *Applied multivariate statistics for the social sciences* ($3^{rd}$ edition). Mahwah, N.J.: Erlbaum.

Strakowski, S. M., DelBello, M. P., Sax, K. W., Zimmerman, M. E., Shear, P. K., Hawkins, J. M., & Larson, E. R. (1999) Brain magnetic resonance imaging of structural abnormalities in bipolar disorder. Arch.Gen.Psychiatry 56: 254–260.

Szeszko, P. R., Robinson, D., Alvir, J. M., Bilder, R. M., Lencz, T., Ashtari, M., Wu, H., & Bogerts, B. (1999) Orbital frontal and amygdala volume reductions in obsessive-compulsive disorder. Arch.Gen.Psychiatry 56: 913–919.

Truyen, L. et al (1996) Accumulation of hypointense lesions ("black holes") on T1 spin-echo MRI correlates with disease progression in multiple sclerosis. Neurology. 47: 1469–176.

Vaidyanathan M, Clarke L P, Hall L O, Heidtman C, Velthuizen R, Gosche K, Phuphanich S, Wagner H, Greenburg H and Silbiger M L. Monitoring brain tumor response to therapy using MRI segmentation. Magnetic Resonance Imaging, 15(3), 323–334, 1997.

Velthuizen R P, Clarke L P, Phuphanich S, Hall L O, Bensaid A M, Arrington J A, Greenberg H M and Silbiger M L. Unsupervised measurement of brain tumor volume on MR images. Journal of Magnetic Resonance Imaging 5(5), 594–605, 1995.

Webb, J., Guimond, A., Eldridge, P., Chadwick, D., Meunier, J., Thirion, J. P., & Roberts, N. (1999) Automatic detection of hippocampal atrophy on magnetic resonance images. Magn.Reson.Imaging 17: 1149–1161.

Wicks, D. A. G., et. al., Volume measurement of multiple sclerosis lesions with magnetic resonance imaging. Neuroradiology 34:475–479, 1992

Wright, I.C., Rabe-Hesketh, S., Woodruff, P. W, David, A. S., Murray, R. M., & Bullmore, E.T. (2000) Meta-analysis of regional brain volumes in schizophrenia. Am.J Psychiatry2000. January;157(1):16–25. 157: 16–25.

Ylikoski R, Ylikoski A, Erkinjuntti T, et al. White matter changes in healthy elderly persons correlate with attention and speed of mental processing. Arch Neurol 50: 818–824, 1993.

Zar, J. H., Biostatistical Analysis $3^{rd}$ ed. (Prentice-Hall, Upper Saddle River) 1996. pp.72–75

In an embodiment of the instant invention, an automated, or computer-implemented, method of identifying suspected lesions in a brain is provided, by way of illustration, in FIG. 9. In Step S100, a processor or scanner provides a magnetic resonance image (MRI) of a patient's head, including a plurality of slices of the patient's head, which MRI comprises a multispectral data set that can be displayed as an image of varying pixel or voxel intensities. In Step S110, the processor identifies a brain area within each slice to provide a plurality of masked images of intracranial tissue. In Step S120, the processor, applies a segmentation technique to at least one of the masked images to classify the varying pixel intensities into separate groupings, which potentially correspond to different tissue types. In Step S130, the processor refines the initial segmentation into the separate groupings of at least the first masked image obtained from Step S120 using one or more knowledge rules that combine pixel intensities with spatial relationships of anatomical structures to locate one or more anatomical regions of the brain. In Step S140, the processor identifies, if present, the one or more anatomical regions of the brain located in Step S130 in other masked images obtained from Step S120. In Step S150, the processor further refines the resulting knowledge rule-refined images from Steps S130 and S140 to locate suspected lesions in the brain.

Figure 10:
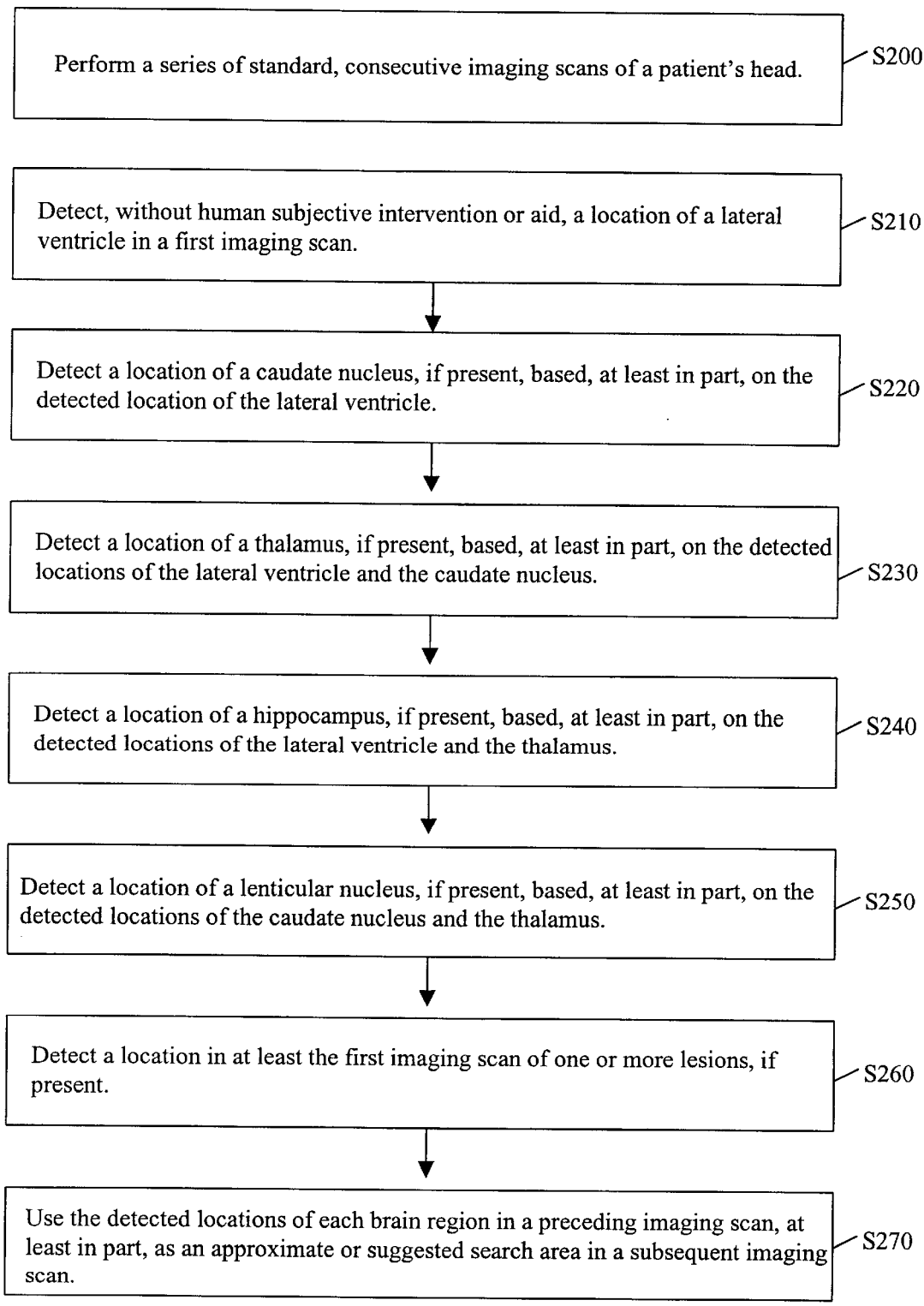
FIG. 10 is another illustrative embodiment of a flowchart consistent with the instant invention.

In another embodiment of the instant invention, as shown, by way of illustration, in FIG. 10, a method for determining volumetric measurements and/or detecting lesion tissue is provided. Such determinations and/or detections occur, for instance, in subcortical regions of a brain. Examples of such subcortical regions include, but are not limited to, the hippocampus, the thalamus, the hypothalamus, the caudate nuclei; and the lenticular nuclei, which in turn includes the globus pallidus and putamen. The determinations and/or detections according to the instant invention are equally applicable to non-subcortical regions of the brain including, but not limited to, the brain stem, and/or the cerebellum. For completeness, lesions are not found in cerebrospinal fluid ("CSF"). Accordingly, lesion detection is optionally not performed in the CSF found in the lateral ventricle. Additionally, it will be readily appreciated that the method discussed hereinbelow is optionally performed for a left and/or a right side of a brain.

In Step S200, a user performs a series of standard, consecutive imaging scans of a patient's head. For instance, the standard imaging scans include standard magnetic resonance imaging ("MRI") scans. Such MRI scans include standard, traditional MRI scans and/or standard, functional MRI scans. By way of example, the scans are axial, coronal, or sagittal. The scans are of standard thickness, e.g., 3 mm or 5 mm. One of ordinary skill in the art will readily recognize that alternative thicknesses are acceptable. For instance, a series of thicker scans will yield more coarse volumetric measurements than a series of thinner scans. Optionally, to account for possible MRI machine irregularities or malfunctions, each scan is conceptually divided into plurality of sections, for example, quarters. If the scans are so divided, one of ordinary skill in the art will readily appreciate that the following steps apply for each section.

Each MRI scan in the series includes one or more standard modalities or standard data acquisitions. For example, such standard data acquisitions include a proton density weighted ("PDw") data acquisition, a spin-lattice relaxation time ("T1s") data acquisition, and/or a spin-spin relaxation time ("T2w") data acquisition. Alternate standard acquisitions are acceptable. One of ordinary skill in the art will readily appreciate the trade-offs between the myriad factors associated with MRI brain scans including, but not limited to, the type of image to acquire, cost, time, resolution, slice thickness, distance between slices, and signal-to-noise ratios.

In Step S210, a standard processor effecting the instant invention detects a location of a lateral ventricle, if present, at least in part, by detecting CSF in the lateral ventricle in a first imaging scan. Optionally, the processor sums all of the voxels within and/or including a border of the lateral ventricle.

In Step S220, based, at least in part, on the detected location of the lateral ventricle, the processor detects a location in the first imaging scan a caudate nuclei, if present, which curves into the lateral ventricle. By way of example, the processor optionally determines the location of a superior border of a curvature of the caudate nuclei, at least in part, from one or more extreme minimum/maximum points on the lateral ventricle. The processor optionally determines a location of an inferior border of the caudate nuclei by following the curvature thereof. The processor optionally determines a location of a exterior border of the caudate nuclei, at least in part, by detecting an internal capsule, which includes very dark, white matter. Alternatively, the processor optionally determines the location of the exterior border of the caudate nuclei, at least in part, from a standard spline fit or interpolated curve of the known borders. For example, the processor moves the standard spline fit until the processor detects deep white matter, thereby generating a smart "best fit" border for the caudate nuclei. Optionally, the processor sums all of the voxels within and/or including a border of the caudate nuclei.

In Step S230, the processor detects a location in the first imaging scan of a thalamus, if present, based, at least in part, on the locations of the detected lateral ventricle and the detected caudate nuclei. By way of example, the processor identifies a superior border of the thalamus, at least in part, from the inferior border of the caudate nuclei and identifies a medial border of the thalamus, at least in part, from a lateral edge of the lateral ventricle. Optionally, the processor sums all of the voxels within and/or including a border of the thalamus.

In Step S240, the processor detects a location in the first imaging scan of a hippocampus, if present. For instance, the processor identifies the hippocampus as being inferior to the thalamus and proximate to the lateral ventricle. Optionally, the processor sums all of the voxels within and/or including a border of the hippocampus.

In Step S250, the processor detects a location in the first imaging scan of a lenticular nuclei based, at least in part, from the locations of the detected caudate nuclei and the detected thalamus. For instance, the processor identifies the lenticular nuclei as being inferior to the superior border of the caudate nuclei, superior to the inferior border of the thalamus, and/or medial to an insolor cortex, which is entrapping CSF. Optionally, the processor further identifies a border of the lenticular nuclei from a standard spline fit. By way of illustration, the processor moves the spline fit defining a presumptive border of the lenticular nuclei until it reaches an external capsule of the brain. Optionally, the processor sums all of the voxels within and/or including a border of the lenticular nuclei.

In Step S260, the processor detects a location in the first imaging scan of one or more lesions, if present. By way of illustration, the processor generates from the first imaging scan a corresponding virtual or actual image free of the detected subcortical regions, CSF in a sulci, and/or gray matter, for example, around the sulci, thereby retaining or defining a border of white matter in the generated image. The processor optionally generates an intensity gradient on the remaining generated image to identify possible or suspected lesions, if present. For instance, the processor generates the intensity gradient using standard Z-scores.

For each subsequent imaging scan, the processor repeats Steps 210 through 250. Optionally, for each subsequent scan, the processor maintains a running sum of voxels for each detected cerebral region to a previous sum obtained from the preceding scan(s). Optionally, after all of the imaging scans have been so processed, a volumetric measurement of each detected cerebral region, at least in part, by multiplying the sum of voxels for each region by a volume of a single voxel. Optionally, by doing so, total intracranial volume, ventricular volume, total CSF volume, sulcal CSF volume, white matter volume, and/or gray matter volume are measured using the instant invention.

For each subsequent imaging scan, the processor repeats the following steps. In Step S270, the processor uses the detected locations of each brain region in a preceding imaging scan, at least in part, as an approximate or suggested search area for the same brain region in the subsequent imaging scan. For example, the processor performs a standard blobbing or voxel-clustering technique to identify such approximate or suggested search areas for a cerebral region. The processor, for example, then dilates and/or constricts the suggested search area of each detected cerebral region to detect volume changes from a preceding imaging scan to a subsequent imaging scan.

Optionally, at least a portion of the above-mentioned method, and preferably the entire method, is run on a plurality of occasions separated in time to monitor disease progression and/or success of therapy. The separations in time include regular or irregular time intervals. By way of illustration, volumetric changes in regions of interest detected over time may show atrophy of a region in a patient. For instance, over a period of time, atrophy of the hippocampus, as evidenced by output of the instant invention, may be indicative of progression of Alzheimer's disease.

Figure 11:
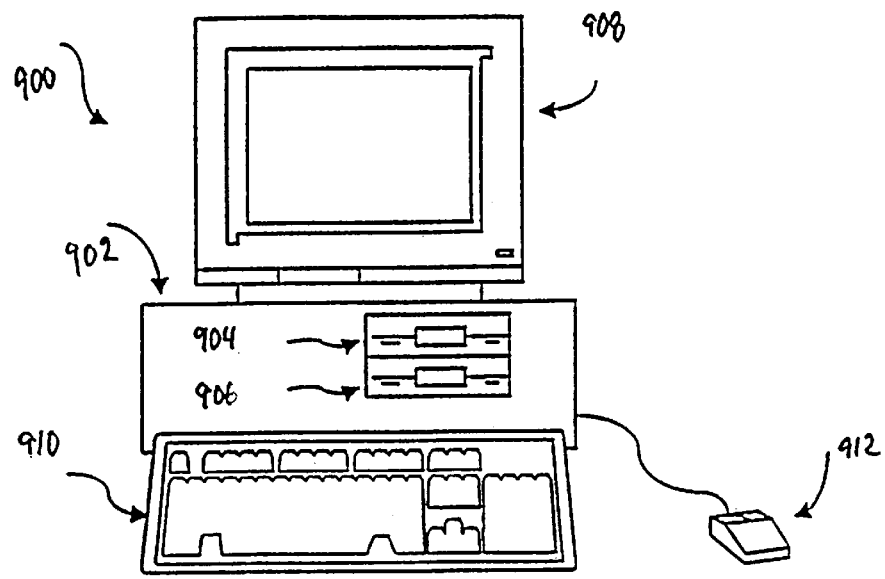
FIG. 11 is an illustrative embodiment of a computer and assorted peripherals.

For completeness, FIG. 11 is an illustration of a main central processing unit for implementing the computer processing in accordance with a computer implemented embodiment of the present invention. The procedures described herein are presented in terms of program procedures executed on, for example, a computer or network of computers.

Viewed externally in FIG. 11, a computer system designated by reference numeral 900 has a computer 902 having disk drives 904 and 906. Disk drive indications 904 and 906 are merely symbolic of a number of disk drives which might be accommodated by the computer system. Typically, these would include a floppy disk drive 904, a hard disk drive (not shown externally) and a CD ROM indicated by slot 906. The number and type of drives varies, typically with different computer configurations. Disk drives 904 and 906 are in fact optional, and for space considerations, are easily omitted from the computer system used in conjunction with the production process/apparatus described herein.

The computer system also has an optional display 908 upon which information is displayed. In some situations, a keyboard 910 and a mouse 902 are provided as input devices to interface with the central processing unit 902. Then again, for enhanced portability, the keyboard 910 is either a limited function keyboard or omitted in its entirety. In addition, mouse 912 optionally is a touch pad control device, or a track ball device, or even omitted in its entirety as well. In addition, the computer system also optionally includes at least one infrared transmitter and/or infrared received for either transmitting and/or receiving infrared signals, as described below.

Figure 12:
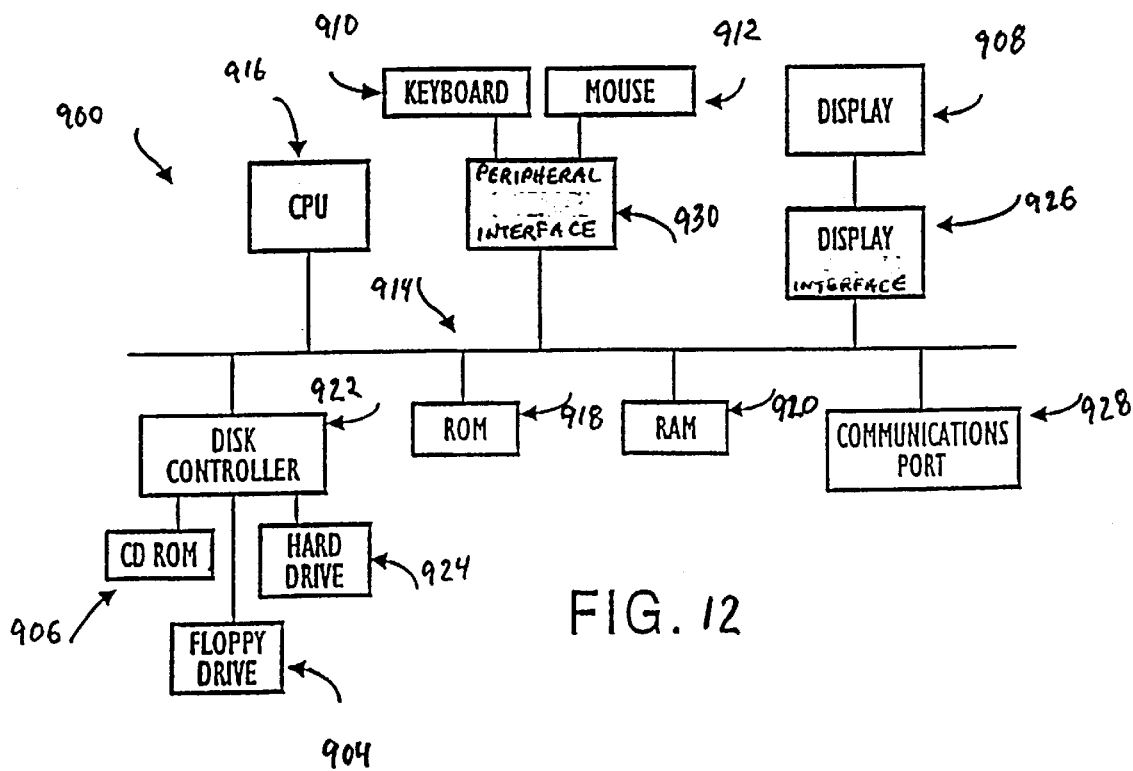
FIG. 12 is an illustrative embodiment of internal computer architecture consistent with the instant invention.

FIG. 12 illustrates a block diagram of the internal hardware of the computer system 900 of FIG. 11. A bus 914 serves as the main information highway interconnecting the other components of the computer system 900. CPU 916 is the central processing unit of the system, performing calculations and logic operations required to execute a program. Read only memory (ROM) 918 and random access memory (RAM) 920 constitute the main memory of the computer. Disk controller 922 interfaces one or more disk drives to the system bus 914. These disk drives are, for example, floppy disk drives such as 904, or CD ROM or DVD (digital video disks) drive such as 906, or internal or external hard drives 924. As indicated previously, these various disk drives and disk controllers are optional devices.

A display interface 926 interfaces display 908 and permits information from the bus 914 to be displayed on the display 908. Again as indicated, display 908 is also an optional accessory. For example, display 908 could be substituted or omitted. Communications with external devices, for example, the components of the apparatus described herein, occurs utilizing communication port 928. For example, optical fibers and/or electrical cables and/or conductors and/or optical communication (e.g., infrared, and the like) and/or wireless communication (e.g., radio frequency (RF), and the like) can be used as the transport medium between the external devices and communication port 928. Peripheral interface 930 interfaces the keyboard 910 and the mouse 912, permitting input data to be transmitted to the bus 914. In addition to the standard components of the computer, the computer also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system optionally uses a low power radio transmitter and/or a low power radio receiver. The low power radio transmitter transmits the signal for reception by components of the production process, and receives signals from the components via the low power radio receiver. The low power radio transmitter and/or receiver are standard devices in industry.

Figure 13:
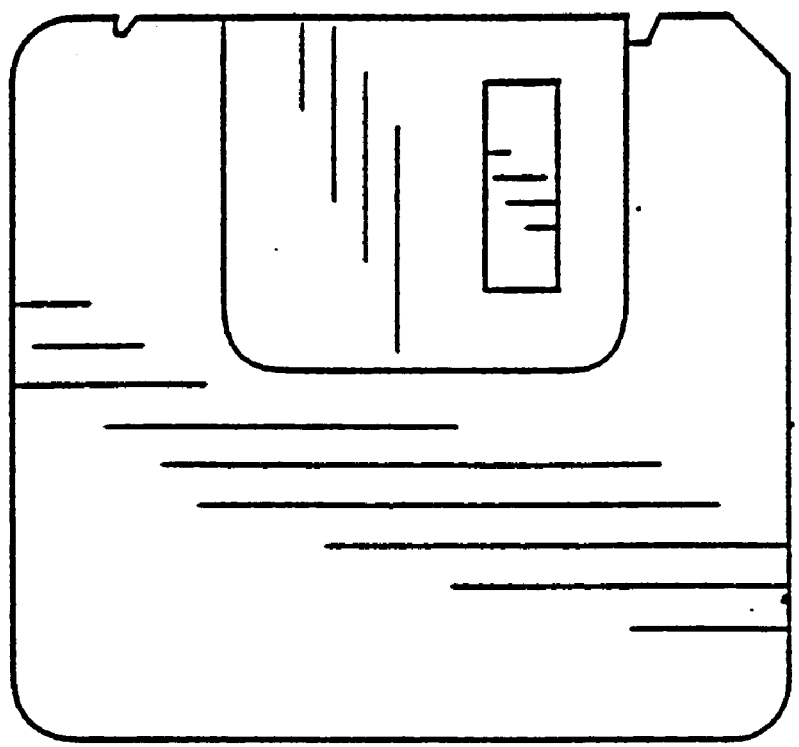
FIG. 13 is an illustrative embodiment of a memory medium.

FIG. 13 is an illustration of an exemplary memory medium 932 which can be used with disk drives illustrated in FIGS. 11 and 12. Typically, memory media such as floppy disks, or a CD ROM, or a digital video disk will contain, for example, a multi-byte locale for a single byte language and the program information for controlling the computer to enable the computer to perform the functions described herein. Alternatively, ROM 918 and/or RAM 920 illustrated in FIG. 12 can also be used to store the program information that is used to instruct the central processing unit 916 to perform the operations associated with the production process.

Although computer system 900 is illustrated having a single processor, a single hard disk drive and a single local memory, the system 900 is optionally suitably equipped with any multitude or combination of processors or storage devices. Computer system 900 is, in point of fact, able to be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration is, for example, arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and, in particular, CPU 916, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

FIG. 14 is an illustration of the architecture of the combined internet, POTS, and ADSL architecture for use in the present invention in accordance with another embodiment. In FIG. 14, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 254, 256 may also be combined with, for example, user networds 222, 224, and 228. As illustrated in this embodiment, users may access or use or participate in the administration, management computer assisted program in computer 240 via various different access methods. In this embodiment, the various databases 230, 232, 234, 236 and/or 238 are accessible via access to and/or by computer system 240, and/or via internet/local area network 220. These databases may optionally include objective criteria for evaluating the corporate governance characteristics for ranking the corporation.

For example, environmental data is generally publicly available which indicates a corporation's compliance history, outstanding violations or potential violations, and the like. Similarly, standard legal and/or regulatory and/or administrative and/or business databases may be consulted to obtain additional information on corporate governance techniques, potential for government intervention, shareholder participation and/or customer loyalty. All this data may then be collected and analyzed to determine the overall attributes of the corporate, shareholder, government, and customer agents, for input into the simulation. Alternatively, the individual data may be used and input into the simulation, and the simulation may digest or process the data individually or collectively as part of the simulation.

In accordance with this embodiment, workstation 240 optionally includes modules 242, 246, 248, and 250 for individually handling the operations/simulation of the different agents. Alternatively, one module or a different number of modules may be used for processing the agent relationships, processes, and or interactions.

One of ordinary skill in the art will recognize that with respect to the above-described computer network, the scope of the instant invention includes any suitable internet (lower case), i.e., any set of networks interconnected with devices, such as routers, that forward messages or fragments of messages between networks or intranets. Naturally, the Internet (upper case) is one of the largest examples of an internet.

To this end, it is to be understood that the elements of the service provider network, shown for illustrative purposes in FIGS. 12 and 14 as being located in geographic proximity to one another in a substantially centralized processing environment, may alternatively be arranged in a standard distributed processing environment so as to leverage resources, e.g., servers and storage devices, located at two or more sites.

In an alternative embodiment, the above-mentioned computer network may include a virtual private network (VPN), thereby taking advantage of existing PSTN infrastructure while providing a secure and private environment for information exchange regarding resource usage. Advantageously, data sent from the VPN is encrypted, thereby enhancing the privacy of customers. That is, because the VPN includes a tunneling protocol, the instant invention effectively uses the Internet as part of a private secure network. That is, the "tunnel" is the particular path that a given company message or file might travel through the Internet.

In another embodiment, the above-described computer network may alternatively include an extranet, wherein customers may securely exchange large volumes of resource usage data using a standard data exchange format, for example, Electronic Data Interchange. To this extent, an extranet may enable customers to share news of common interest, for example, aggregated resource usage, exclusively with partner companies.

It should be understood that although standard graphical user interface browsers have been discussed, standard text-only browsers, such as Lynx, may be used for UNIX shell and VMS users. Users of such text-only browsers may download comma-delimited ASCII files of, for example, their usage data.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

References

The following citations are incorporated herein by reference:

1. Johnson, K. A., Davis, K. R., Buonanno, F. S., Brady, T. J., Rosen,T.J., Growdon, J. H., (1987) Comparison of Magnetic Resonance and Roentgen Ray Computed Tomography in Dementia. Arch Neurol 44: 1075–1080
2. Goldberg-Zimring D., Achiron A., Miron S., Faibel M., Azhari H., (1998) Automated detection and Characterization of Multiple Sclerosis Lesions in Brain MR Images. Magnetic Resonance Imaging 16(3): 311–318
3. Udupa J. K., Wei L., Samaraskera Y., Miki M., van Buchem M. A., Grossman R. I., (1997) Multiple Sclerosis Lesion Quantification Using Fuzzy Connectedness Principles. IEEE Transactions on Medical Imaging 16(5) :598–609
4. Miller, D. H., Grossman, R. I., Reingold, S. C., McFarland, H. F., (1998) The Role of Magnetic Resonance Techniques in Understanding and Managing Multiple Sclerosis. Brain 121:3–24
5. Gosche K. M., Velthuizen R. P., Murtagh F. R., Arrington J. A., Mortimer J. A., Clarke L. P., (1999) Automated Quantification of Brain MRI Hyperintensities Using Hybrid Clustering and Knowledge Based Methods. IJIST May (in press), Special edition on Aging Research
6. Cline H. E., Lorensen W. E., Kikinis R., Jolesz F., (1990) Three-Dimensional Segmentation of MR Images of the Head Using Probability and Connectivity. J Comp Ass Tom 14(6):1037–1045
7. Hohol, M. J., Guttmann, C. R., Orav, J., Mackin, G. A., Kikinis, R., Khoury, S. J., Jolesz, F. A., Weiner, H. L.,(1997) Serial Neuropsychological Assessment and Magnetic Resonance Imaging Analysis in Multiple Sclerosis. Arch Neurol 54:1018–1025
8. Wicks D. A., Tofts P. S., Miler D. H., du Bolay G. H., Feinstein A., Sacares R. P., Harvey I., Brenner R., McDonald W. I., (1992) Volume Measurement of Multiple Sclerosis Lesions with Magnetic Resonance Images. Neuroradiology 34:475–479
9. Wang, L., Lai, H-M., Barker, G. J., Miller, D. H., Tofts, P. S., (1998) Correction for Variations in MRI Scanner Sensitivity in Brain Studies with Histogram Matching. MRM 39:322–327
10. Zijbendos A. P., Dawant B. M., Margolin R. A., Palmer A. C., (1994) Morphometric Analysis of White Matter Lesions in MR Images: Method and Validation. IEEE Trans Med Imag 13(4):716–724
11. Mitchell J. R., Karlik S. J., Lee H., Eliasziw M., Rice G. P., Fenster A., (1996) The Variability of Manual and Computer Assisted Quantification of Multiple Sclerosis Lesion Volumes. Med Phys 23(1):85–97
12. Mitchell J. R., Jones C., Karlik S. J., Kennedy K., Lee D. H., Rutt B., Fenster A., (1997) MR Multispectral Analysis of Multiple Sclerosis Lesions. JMRI 7:499–511
13. Samaraskera S., Udupa J. K., Miki Y., Wei L., Grossman R. I., (1997) A New Computer Assisted Method for the Quantification of Enhancing Lesions in Multiple Sclerosis. J Comp Ass Tom 21(1):145–151
14. Mitchell J. R., Karlik S. J., Lee D. H., Fenster A., (1994) Computer-assisted Identification and Quantification of Multiple Sclerosis Lesions in MR Imaging Volumes in the Brain. JMRI 4:197–208
15. Vinitski, S., Gonzalez, C., Mohamed, F., Iwanaga, T., Knobler, R. L., Khalili, K., Mack, J., (1997) Improved Intracranial Lesion Characterization by Tissue Segmentation Based on 3D Feature Map. MRM 37: 457–469
16. Pannizzo F., Stallmeyer M. J., Freidman J., Jenrnis R. J., Zabriskie J., Plank C., Zimmerman R., Whalen J. P., Cahill P. T., (1992) Quantitative MRI Studies for Assessment of Multiple Sclerosis. Mag Res Med 24:90–99
17. Kapouleas I., (1990) Automatic Detection of White Matter Lesions in Magnetic Resonance Brain Images. Comp Meth Prog Biomed 32:17–35
18. Li C., Goldgof B., Hall L. O., (1993) Knowledge-Based Classification and Tissue Labeling of MR Images of Human Brain. IEEE Trans Med Imag 12(4):740–750
19. Warfield S., Dengler J., Zaers J., Guttman C., Wells W., Ettinger J., Hiller J., Kikinis R., (1995) Automatic Detection of Gray Matter Structures from MRI to Improve the Segmentation of White Matter Lesions. J Imag Guid Surg 1:326–338
20. Johnston B., Atkins M., Mackiewich B., Anderson M., (1996) Segmentation of Multiple Sclerosis Lesion in intensity corrected multispectral MRI. IEEE Trans Med Imag 15(2): 154–169
21. DiCarli C., Murphy D., Tranh M., Grady C. L., Haxby J. V., Gillette J. A., Salerno J. A., Gonzales-Aviles A., Horwitz B., Rapoport S. I., Schapiro M. B., (1995) The Effect of White Matter Hyperintensity Volume on Brain Structure, Cognitive Performance, and Cerebral Metabolism of Glucose in 51 Healthy Adults. Neurology 45:2077–2084
22. DeCarli C., Maisog J., Murphy D., Teichberg D., Rapoport S. I., Horwitz B., (1992) Method for Quantification of Brain, Ventricular, and Subarachnoid CSF Volumes from MR Images, J Comp Ass Tom 16(2):274–284
23. Brunetti A., Tedeschi G., Di Costanzo A., Covelli E. M., Aloj L., Bonavita S., Ciarmiello A., Alfano B., Salvatore M., (1997) White Matter Lesion Detection in Multiple Sclerosis: Improved Interobserver Concordance with Multispectral MRI Display. J Neurology 244:586–590
24. Alfano B., Brunetti A., Ciarmello A., Salvatore M., (1992) Simultaneous Display of Multiple MR Parameters with "Quantitative Magnetic Color Imaging". J Comp Ass Tom 16(4): 634–640
25. Alfano B., Brunetti A., Arpaia M., Cialmiello A., Covelli E., Salvatore M., (1995) Multiparametric Display of Spin Echo Data from MR Studies of Brain. JMRI 5: 217–225
26. Wicks D. A., Barker G. J., Tofts P. S., (1993) Correction of Intensity NonUniformity in MR Images of Any Orientation. Mag Res Imag 11: 183–196

What is claimed is:

1. A method of interpreting at least one imaging scan of a patient, comprising the step of:
   (a) identifying a location of at least one cerebral region in the imaging scan based, at least in part, on a relative location of a lateral ventricle, said identifying step (a) being free of human intervention.
2. The method according to claim 1, wherein the at least one imaging scan includes a plurality of consecutive imaging scans, said method further comprising the step of:
   (b) identifying a location of each cerebral region of the at least one cerebral region within a successive imaging scan of the plurality of imaging scans based, at least in part, on a location of a corresponding cerebral region within a preceding imaging scan of the plurality of imaging scans, said identifying step (b) being free of human intervention.
3. The method according to claim 1, further comprising the step of:
   (c) determining a volumetric measurement for the at least one cerebral region.
4. The method according to claim 1, further comprising the step of:
   (d) identifying a suspected presence of white matter lesion tissue in the imaging scan based on a knowledge base relating voxel intensity distributions and a spatial relationship of cerebral anatomical structures.
5. The method according to claim 4, wherein said identifying step (d) includes identifying white matter regions in the at least one imaging scan, eliminating therefrom voxels identifiable as at least one of white matter, a perivascular space, and cerebrospinal fluid.
6. The method according to claim 5, wherein the white matter regions include at least one of an internal capsule, a frontal lobe, an anterior temporal lobe, an anterior parietal lobe, a posterior parietal lobe, an occipital lobe, and a posterior temporal lobe.
7. The method according to claim 1, wherein said at least one cerebral region includes at least one of a caudate nucleus, a lenticular nucleus, a thalamus, a hippocampus, a periventricular ring, white matter, a brain stem, and a cerebellum.
8. The method according to claim 1, further comprising the step of generating a template unique to the patient, the template including each identified at least one cerebral region.
9. The method according to claim 8, wherein the at least one imaging scan includes a plurality of consecutive imaging scans, said method further comprising the step of:
   (b) identifying a location of each cerebral region of the at least one cerebral region in a successive imaging scan of the plurality of imaging scans based, at least in part, on a location of a corresponding cerebral region in a preceding imaging scan of the plurality of imaging scans, using the generated template.
10. An automated method of identifying suspected lesions in a brain, which comprises:
    (a) providing a magnetic resonance image (MRI) of a patient's head, including a plurality of slices of the patient's head, which MRI comprises a multispectral data set that can be displayed as an image, wherein said image comprises varying pixel intensities;
    (b) identifying a brain area within each slice to provide a plurality of masked images of intracranial tissue;
    (c) applying a segmentation technique to at least one of the masked images to classify the varying pixel intensities into separate groupings, which potentially correspond to different tissue types;
    (d) refining the initial segmentation into the separate groupings of at least a first masked image of the masked images obtained from step (c) using one or more knowledge rules that combine pixel intensities with spatial relationships of anatomical structures to locate one or more anatomical regions of the brain;
    (e) if present, identifying the one or more anatomical regions of the brain located in step (d) in other masked images obtained from step (c);
    (f) further refining the resulting knowledge rule-refined images from steps (d) and (e) to locate suspected lesions in the brain.
11. The method of claim 10 in which said magnetic resonance image comprises a multispectral data set including proton density weighted (PDw), T1 weighted (T1w) and T2 weighted (T2w) acquisitions.
12. The method of claim 10 in which the slices are taken in the axial, coronal, or sagittal planes of the patient's head.
13. The method of claim 10 in which the varying pixel intensities are classified into at least three separate groupings which potentially correspond to at least three different tissue types, including a first tissue type, a second tissue type, and a third tissue type.

14. The method of claim 10, wherein said further refining step (f) comprises identifying hyperintensities in the one or more anatomical regions of the brain, and said method further comprising the step of:
 (a) determining volumetric measurements of the located suspected lesions.

15. An apparatus for interpreting at least one imaging scan of a patient, comprising:
 (a) first identifying means for identifying a location of at least one cerebral region in the imaging scan based, at least in part, on a relative location of a lateral ventricle, said first identifying means (a) being free of human intervention.

16. The apparatus according to claim 15, wherein the at least one imaging scan includes a plurality of consecutive imaging scans, said apparatus further comprising:
 (b) second means for identifying a location of each cerebral region of the at least one cerebral region in a successive imaging scan of the plurality of imaging scans based, at least in part, on a location of a corresponding cerebral region in a preceding imaging scan of the plurality of imaging scans, said second identifying means (b) being free of human intervention.

17. The apparatus according to claim 16, further comprising:
 (c) means for determining a volumetric measurement for the at least one cerebral region.

18. The apparatus according to claim 15, further comprising:
 (d) third means for identifying a suspected presence of white matter lesion tissue in the imaging scan based on a knowledge base relating voxel intensity distributions and a spatial relationship of cerebral anatomical structures.

19. The apparatus according to claim 15, further comprising means for generating a template unique to the patient, the template including each identified at least one cerebral region.

20. The apparatus according to claim 19, wherein the-at least one imaging scan includes a plurality of consecutive imaging scans, said apparatus further comprising:
 (a) fourth means for identifying a location of each cerebral region of the at least one cerebral region in a successive imaging scan of the plurality of imaging scans based, at least in part, on a location of a corresponding cerebral region in a preceding imaging scan of the plurality of imaging scans, using the template unique to the patient.

21. A computer readable medium including instructions being executed by a computer, the instructions instructing the computer to execute an interpretation of at least one imaging scan of a patient, the instructions comprising:
 (a) identifying a location of at least one cerebral region in the imaging scan based, at least in part, on a relative location of a lateral ventricle, said identifying instruction (a) being free of human intervention.

22. The computer readable medium according to claim 21, wherein the at least one imaging scan includes a plurality of consecutive imaging scans, said instructions further comprising:
 (b) identifying a location of each cerebral region of the at least one cerebral region in a successive imaging scan of the plurality of imaging scans based, at least in part, on a location of a corresponding cerebral region in a preceding imaging scan of the plurality of imaging scans, said identifying instruction (b) being free of human intervention.

23. The computer readable medium according to claim 22, wherein the instructions further comprise:
 (c) determining a volumetric measurement for the at least one cerebral region.

24. The computer readable medium according to claim 21, wherein the instructions further comprise:
 (d) identifying a suspected presence of white matter lesion tissue in the imaging scan based on a knowledge base relating voxel intensity distributions and a spatial relationship of cerebral anatomical structures.

25. The computer readable medium according to claim 21, wherein said instructions further comprise generating a template unique to the patient, the template including each identified at least one cerebral region.

26. The computer readable medium according to claim 25, wherein the at least one imaging scan includes a plurality of consecutive imaging scans, said instructions further comprising:
 (b) identifying a location of each cerebral region of the at least one cerebral region in a successive imaging scan of the plurality of imaging scans based, at least in part, on a location of a corresponding cerebral region in a preceding imaging scan of the plurality of imaging scans, using the generated template.

27. The computer system according to claim 21, wherein the instructions further comprise:
 (d) identifying a suspected presence of white matter lesion tissue in the imaging scan based on a knowledge base relating voxel intensity distributions and a spatial relationship of cerebral anatomical structures.

28. A computer system for interpreting at least one imaging scan of a patient, said computer system comprising:
 a processor;
 a memory storing a computer program controlling operation of said processor, said program including instructions for causing the processor to effect:
  (a) identifying a location of at least one cerebral region in the imaging scan based, at least in part, on a relative location of a lateral ventricle, said identifying instruction (a) being free of human intervention.

29. The computer system according to claim 28, wherein the at least one imaging scan includes a plurality of consecutive imaging scans, said instructions further comprising:
 (b) identifying a location of each cerebral region of the at least one cerebral region in a successive imaging scan of the plurality of imaging scans based, at least in part, on a location of a corresponding cerebral region in a preceding imaging scan of the plurality of imaging scans, said identifying instruction (b) being free of human intervention.

30. The computer system according to claim 29, wherein the instructions further comprise:
 (c) determining a volumetric measurement for the at least one cerebral region.

31. The computer system according to claim 28, wherein said instructions further comprise generating a template unique to the patient, the template including each identified at least one cerebral region.

32. The computer readable medium according to claim 31, wherein the at least one imaging scan includes a plurality of consecutive imaging scans, said instructions further comprising:
 (b) identifying a location of each cerebral region of the at least one cerebral region in a successive imaging scan of the plurality of imaging scans based, at least in part, on a location of a corresponding cerebral region in a preceding imaging scan of the plurality of imaging scans, using the generated template.

33. The computer system according to claim 28, further comprising a computer including said processor, the computer communicatable with a user via a computer network.

34. The computer system according to claim 33, wherein said computer includes a Web server.

35. An internet appliance comprising:

a thin client programmably connected via a computer network to a single web hosting facility, the single web hosting facility including a server communicatable with a user via said thin client, said server being in communication with a processor and a computer readable medium including instructions being executed by a processor, the instructions instructing the computer to execute an interpretation of at least one imaging scan of a patient, the instructions comprising:

(a) identifying a location of at least one cerebral region in the imaging scan based, at least in part, on a relative location of a lateral ventricle, said identifying instruction (a) being free of human intervention.

36. The internet appliance according to claim 35, wherein the at least one imaging scan includes a plurality of consecutive imaging scans, said instructions further comprising:

(b) identifying a location of each cerebral region of the at least one cerebral region in a successive imaging scan of the plurality of imaging scans based, at least in part, on a location of a corresponding cerebral region in a preceding imaging scan of the plurality of imaging scans, said identifying instruction (b) being free of human intervention.

37. The internet appliance according to claim 36, wherein the instructions further comprise:

(c) determining a volumetric measurement for the at least one cerebral region.

38. The internet appliance according to claim 35, wherein the instructions further comprise:

(d) identifying a suspected presence of white matter lesion tissue in the imaging scan based on a knowledge base relating voxel intensity distributions and a spatial relationship of cerebral anatomical structures.

39. The internet appliance according to claim 35, wherein said instructions further comprise generating a template unique to the patient, the template including each identified at least one cerebral region.

40. The internet appliance according to claim 39, wherein the at least one imaging scan includes a plurality of consecutive imaging scans, said instructions further comprising:

(b) identifying a location of each cerebral region of the at least one cerebral region in a successive imaging scan of the plurality of imaging scans based, at least in part, on a location of a corresponding cerebral region in a preceding imaging scan of the plurality of imaging scans, using the generated template.

* * * * *